(12) United States Patent
Asano et al.

(10) Patent No.: US 6,725,831 B2
(45) Date of Patent: Apr. 27, 2004

(54) ENGINE FUEL CONTROL DEVICE AND IDLING AIR-FUEL RATIO CONTROL METHOD

(75) Inventors: Seiji Asano, Hitachinaka (JP); Bunji Igarashi, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/328,045

(22) Filed: Dec. 26, 2002

(65) Prior Publication Data

US 2003/0116127 A1 Jun. 26, 2003

(30) Foreign Application Priority Data

Dec. 26, 2001 (JP) ........................................ 2001-393338

(51) Int. Cl.[7] ............................................... F02D 41/00
(52) U.S. Cl. ............................... 123/339.23; 123/339.19
(58) Field of Search ....................... 123/339.23, 339.19, 123/339.14, 339.1

(56) References Cited

U.S. PATENT DOCUMENTS 5,575,255 A * 11/1996 Abe et al. .................... 123/336
5,586,534 A * 12/1996 Fujimoto ..................... 123/325

* cited by examiner

Primary Examiner—Bibhu Mohanty
(74) Attorney, Agent, or Firm—Crowell & Morning LLP

(57) ABSTRACT

An engine fuel control device includes an idle speed control valve that controls an engine speed during idling by bypassing a throttle valve, an air bleed valve that is disposed downstream from a regulator for regulating the pressure of a fuel gas supplied to the engine and that controls a flow path area of a passage open to atmosphere, a target speed setting means that sets a target engine speed during idling, a throttle valve opening control means that controls the opening of the idle speed control valve so as to maintain the target engine speed, a control factor setting means that sets a factor so as to control the opening of the idle speed control valve, a capturing means that captures a change in a state of the factor, and a control means that controls the air bleed valve based on the change in the state of the factor captured by the capturing means. It controls the air bleed valve.

9 Claims, 28 Drawing Sheets

ENGINE FUEL CONTROL DEVICE AND IDLING AIR-FUEL RATIO CONTROL METHOD

BACKGROUND OF THE INVENTION

The present invention relates to an engine fuel control device and an air-fuel ratio control method during idling and, more particularly, to an improvement made on an air-fuel ratio control method performed by a fuel control system that supplies the engine with gaseous fuel during idling when the engine is started.

A gaseous fuel vehicle mounted with an engine operating on CNG (compressed natural gas), a type of gaseous fuel, is known. The gaseous fuel in a gaseous fuel container is taken through a fuel supply pipe. A pressure reducing valve then regulates a pressure and a flow rate of the gaseous fuel to corresponding predetermined levels. A gas mixer finally mixes the gaseous fuel with air and the fuel is supplied through a fixed venturi to the engine.

Japanese Patent Laid-open No. 2000-18100 discloses a fuel supply system for a gaseous fuel engine. A gaseous fuel supply system disclosed in this publication has the following arrangement. Namely, a three-port solenoid valve is provided at a place near a fixed venturi of a gas mixer located in a point midway a fuel supply pipe. There is also provided a bypass passage that connects the three-port solenoid valve to an air intake system located downstream from a throttle valve of the engine. A control means is provided for controlling the position of the three-port solenoid valve, thereby directing the gaseous fuel toward a side of the bypass passage. In addition, a branch pipe that branches from the fuel supply pipe downstream from a pressure reducing valve. The branch pipe is connected to an auxiliary injector disposed in the air intake system downstream from the engine throttle valve. There is provided the three-port solenoid valve at the place near the fixed venturi of the gas mixer located in a point midway the fuel supply pipe. There is also provided the bypass passage that connects the three-port solenoid valve to the air intake system located downstream from the engine throttle valve. A control means is then provided for controlling the position of the three-port solenoid valve so as to direct gaseous fuel toward the bypass passage side only during starting of the engine, while, during acceleration, actuating the auxiliary injector so as to correct the amount of gaseous fuel supplied.

This arrangement ensures a smooth operation of the three-port solenoid valve, providing communication at one time with the fixed venturi side of the gas mixer and at another time with the bypass passage side, thereby allowing the gaseous fuel to flow smoothly. While ensuring a smooth flow of gaseous fuel, the arrangement directs the fuel toward the bypass passage side during, for example, starting the engine. This eliminates a situation, in which the gaseous fuel is hard to discharge because of a slow flow rate at the fixed venture, thus improving startability.

Japanese Patent Laid-open No. Hei 9-21355 discloses a fuel supply system provided with a regulator that reduces the pressure of the fuel gas to a supply pressure, an oxygen concentration sensor that detects concentration of oxygen in an exhaust gas, an idle state detecting means that detects an engine running in an idle state, and a supply pressure regulating means that regulates the supply pressure when the idle state is detected and, at the same time, an output value of the oxygen concentration sensor falls outside a predetermined range. According to this fuel supply system, the oxygen concentration sensor functions to detect an air-fuel ratio during the idle state and, if it detects a ratio deviating from a predetermined target value, the system corrects the air-fuel ratio, either rich or lean, by means of the fuel gas supply pressure.

The conventional fuel supply system for gaseous fuel engines, such as this one, is designed to maintain a central value for air-fuel ratio correction when the air-fuel ratio during idling gradually deviates due to deterioration with time or the like. The amount of fuel gas supplied is greatly affected by variations in the pressure at a supply port of the fuel gas. Especially when the target idle speed varies greatly causing the flow rate at an ISC valve to increase, the pressure of the supply port changes, thus affecting the air-fuel ratio, which results in the engine speed fluctuating or other effects. In the worst case, the fuel gas becomes excessively rich and the engine speed does not increase, thus diffusing an ISC valve correction amount.

SUMMARY OF THE INVENTION

The present invention has been made in view of the above-mentioned problems, and an object of the present invention is to provide an engine fuel control device and an air-fuel ratio control method during idling that is capable of maintaining a stabilized air-fuel ratio during idling and obtaining a stabilized engine speed.

To achieve the foregoing object, an engine fuel control device according to the present invention is basically provided with a fuel supply means that supplies an engine with a fuel, a mixture ratio determination means that establishes a mixing ratio of a mixture of the fuel and air, a mixture introduction means that introduces the air-fuel mixture, whose mixing ratio is established, a first throttle valve that is disposed in an air intake pipe of the engine, a bypass passage that bypasses the first throttle valve, and a second throttle valve that is disposed in the bypass passage. This engine fuel control device is characterized in that it is further provided with a target speed setting means that sets a target engine speed during idling, a throttle valve opening control means that controls the opening of the second throttle valve so as to maintain the target engine speed, a control factor setting means that sets a factor so as to control the opening of the second throttle valve, a capturing means that captures a change in a state of the factor, and a control means that controls the mixture ratio determination means based on the change in the state of the factor captured by the capturing means.

An idling air-fuel ratio control method according to the present invention controls the opening of a throttle valve disposed in a bypass passage, thereby maintaining a target engine speed during idling. The control method is characterized in that it sets a factor for controlling the throttle valve opening, captures a change in a state of the factor, and controls, based on the change in the state of the factor captured, a mixture ratio determination means that determines a mixture ratio of fuel and air.

According to the engine fuel control device and the idling air-fuel ratio control method configured as described in the foregoing paragraphs, when there is a change in the idling target speed, it changes the ISC valve opening accordingly. The change accordingly changes the pressure in a venturi chamber and the amount of inflow of the fuel mixture gas. As a solution to the aforementioned situation, the air-fuel ratio can be prevented from becoming excessively rich or excessively lean by controlling in advance an air bleed valve in accordance with the amount of change in the target speed.

The idle speed may also deviate from the target speed due to a disturbance on the engine, at which time, the ISC valve opening also changes. The change in the ISC valve opening represents a change in a basic amount and an ISC valve feedback amount. The air bleed valve is then controlled in accordance with this change, which makes it possible to prevent the air-fuel ratio from becoming excessively rich or excessively lean in the same manner as when there is a change in the target speed.

In a preferred embodiment of the engine control device according to the present invention, the mixture ratio determination means is provided with a means that supplies the fuel supply means with fuel and a means that supplies the fuel supply means with air. It is characterized in that it determines a supply ratio of these two supply means.

In the preferred embodiment of the engine control device according to the present invention, the control factor setting means sets, among other control factors it is to set, a basic opening of the throttle valve predetermined for maintaining the target speed.

In the preferred embodiment of the engine control device according to the present invention, the control factor setting means sets, among other control factors it is to set, an opening as calculated through a feedback control performed for making for any deviation between the engine speed and the target speed.

In the preferred embodiment of the engine control device according to the present invention, the control factor setting means sets, among other control factors it is to set, a value storing an opening as calculated through a feedback control performed for expediting convergence of the deviation between the engine speed and the target speed.

In the preferred embodiment of the engine control device according to the present invention, the capturing means captures a change in the state of the factor from the amount of change in the target speed.

In the preferred embodiment of the engine control device according to the present invention, the amount of change in the target speed is detected based on a deviation between the current engine speed and the target speed.

In the preferred embodiment of the engine control device according to the present invention, the capturing means captures a change in the state of the factor from the amount of change in the predetermined basic opening of the throttle valve.

In the preferred embodiment of the engine control device according to the present invention, the capturing means captures a change in the state of the factor from the amount of change in the opening as calculated through the feedback control.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Preferred embodiments of the engine fuel control device and the idling air-fuel ratio control method according to the present invention will be described in detail with reference to the accompanying drawings.

Figure 1:
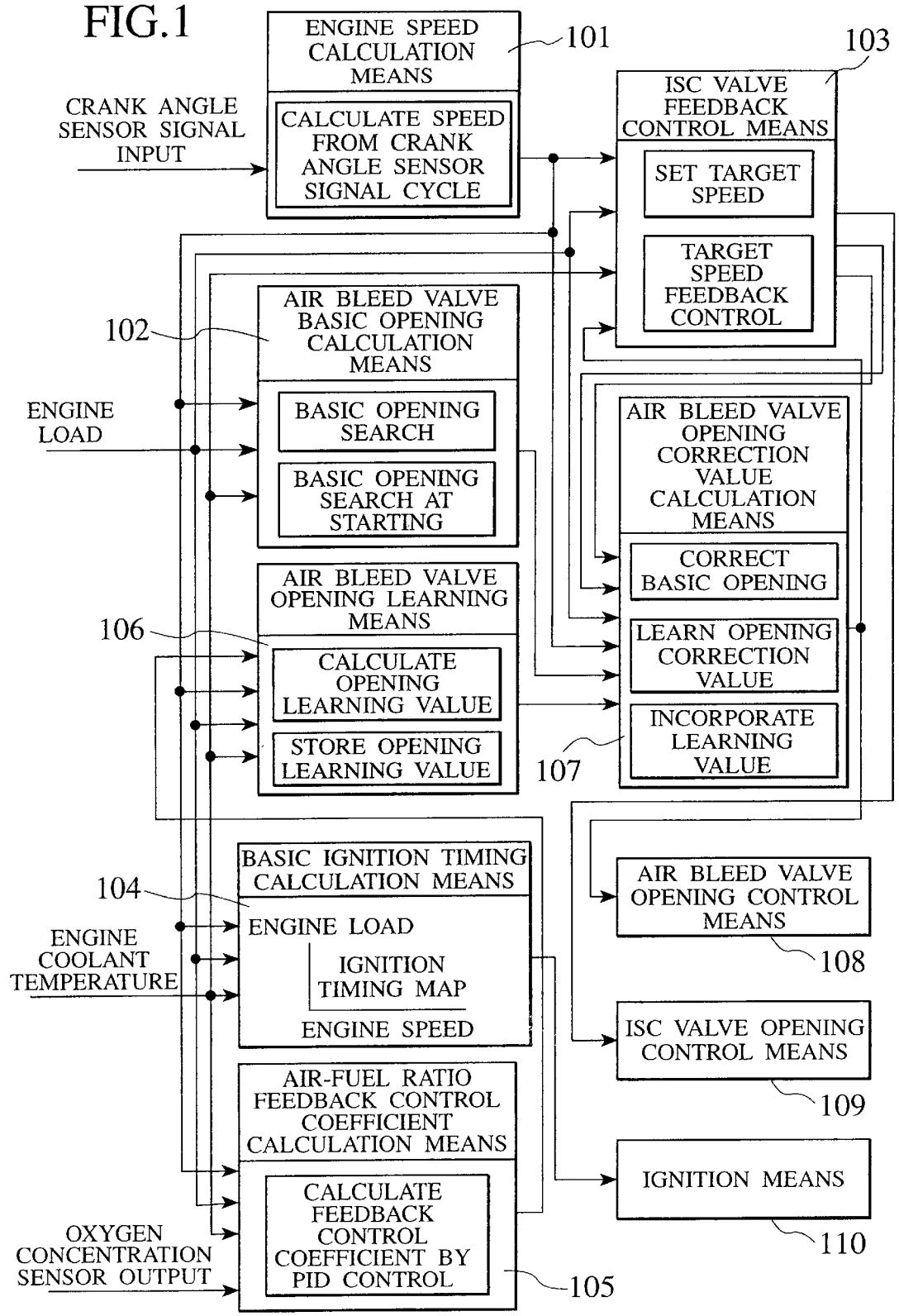
FIG. 1 is a control block diagram for a fuel control device provided with an idling air-fuel ratio control method of a venturi type fuel supply device according to the preferred embodiment of the present invention.

FIG. 1 is a control block diagram for a fuel control device provided with an idling air-fuel ratio control method of a venturi type fuel supply device.

Referring to FIG. 1, a block 101 represents one for an engine speed calculation means. The engine speed calculation means calculates an engine speed per unit time by counting an electrical signal of a crank angle sensor set to a predetermined crank angle position of the engine, mainly the number of inputs per unit time of a pulse signal change, and performing an arithmetic operation. A block 102 calculates an air bleed valve basic opening that results in an optimum air-fuel ratio in each of different operating ranges based on the engine speed calculated in the block 101 and an intake pipe pressure detected by a sensor mounted in an engine air intake pipe used as an engine load.

A block 103 sets a target engine speed during idling from the engine speed calculated in the block 101, the engine load, and an engine coolant temperature and determines an ISC valve opening through a feedback control so as to reach the set target engine speed. A block 104 determines an optimum ignition timing in each of different operating ranges through a map search or the like based on engine loads from the engine speed and the engine load.

A block 105 calculates an air-fuel ratio feedback control coefficient from the engine speed, the engine load, the engine coolant temperature, and an output from an oxygen concentration sensor mounted in an engine exhaust pipe so that a mixture of fuel and air supplied to the engine may be maintained at a target air-fuel ratio to be described later. According to the preferred embodiment, the oxygen concentration sensor produces an output of a signal proportional to an exhaust air-fuel ratio. It is nonetheless possible that the sensor produces an output of a signal indicating that an exhaust gas is on either a rich side or a lean side with respect to a stoichiometric air-fuel ratio.

A block 106 calculates an opening learning value that represents the air bleed valve opening equivalent to the amount of deviation from the target air-fuel ratio based on the air-fuel ratio feedback control coefficient calculated in the block 105. It further stores the calculated value as a learning value.

A block 107 incorporates the following factors in the air bleed valve basic opening calculated in the block 102. Namely, the factors are the opening learning value calculated in the block 106, the air-fuel ratio feedback control coefficient calculated in the block 105, and a correction share for maintaining a good speed control and a good air-fuel ratio control during engine idling. A block 108 controls an actual air bleed valve opening using the air bleed valve opening corrected in the block 107. A block 109 controls an actual ISC valve opening using the ISC valve opening, for which the feedback control is provided in the block 103.

A block 110 represents an ignition means that ignites a fuel mixture that has flowed into a cylinder according to the ignition timing established in the block 104. Though the engine load is represented by the intake pipe pressure according to the preferred embodiment, it may still be represented by the amount of air taken in by the engine.

Figure 2:
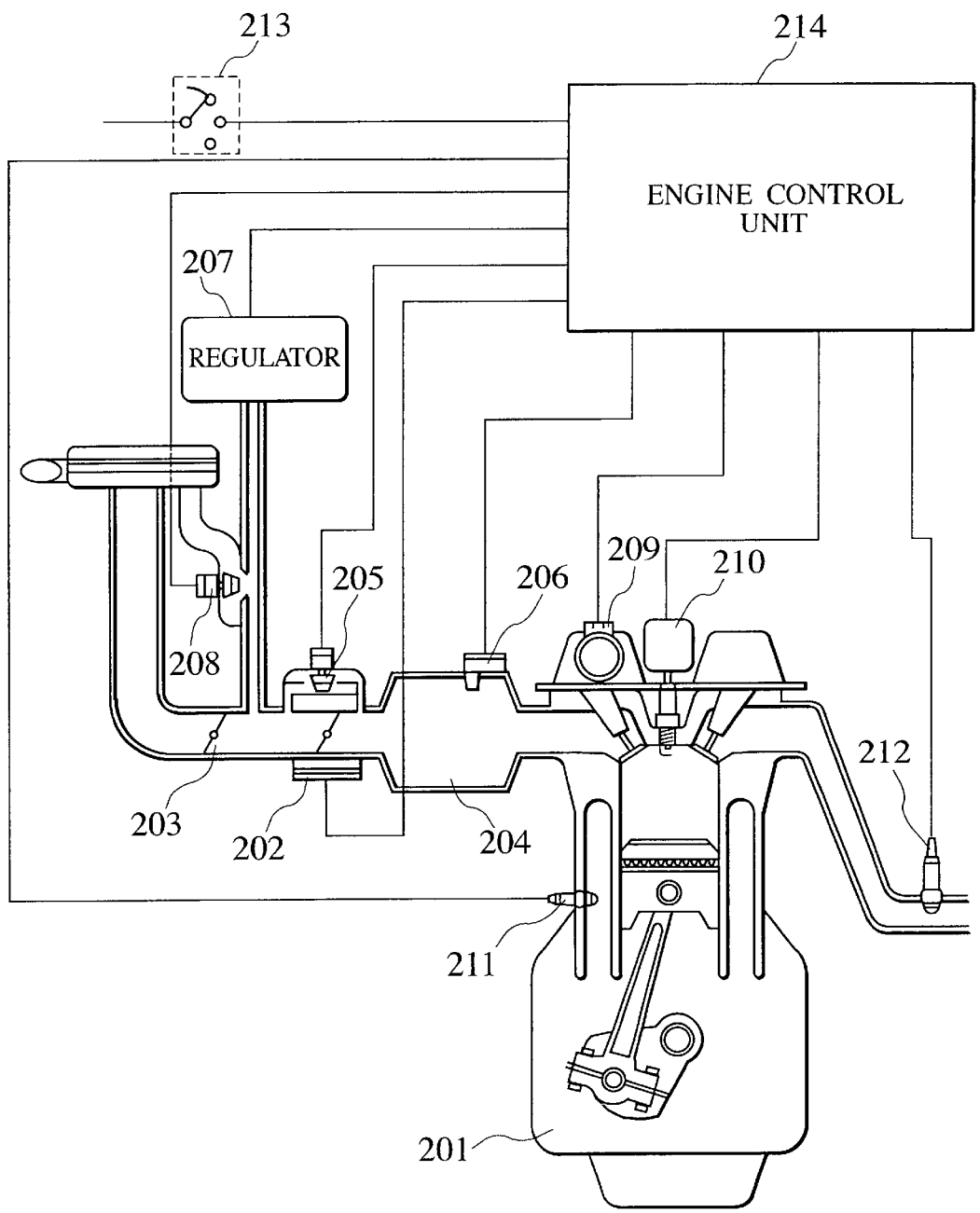
FIG. 2 shows a configuration of parts surrounding an engine controlled by the fuel control device provided with the idling air-fuel ratio control method of the venturi type fuel supply device according to the preferred embodiment.

FIG. 2 shows a configuration of parts surrounding an engine controlled by the fuel control device provided with the idling air-fuel ratio control method of the venturi type fuel supply device.

Referring to FIG. 2, an engine 201 is provided with the following components. Namely, main components include: a throttle valve 202 (a first throttle valve) that limits the amount of air taken in; a choke valve 203 that is disposed upstream from the throttle valve 202 and whose opening is adjusted together with that of the throttle valve 202 through a mechanical linkage mechanism; an idle speed control valve 205 (a second throttle valve) that controls a flow path area of a flow path connected to an intake pipe 204 by bypassing the throttle valve 202, thereby controlling the engine speed during idling; an intake pipe pressure sensor 206 that detects the pressure in the intake pipe 204; a regulator 207 that regulates the pressure of a fuel gas supplied to the engine; and an air bleed valve 208 (a mixture ratio determination means) that is disposed downstream from the regulator 207 and controls the flow path area of a passage open to atmosphere. Other components include: a crank angle sensor 209 that is set to a predetermined crank angle position of the engine; an ignition module 210 that supplies a spark plug that ignites the fuel mixture supplied to the engine cylinder with an ignition energy according to an ignition signal provided by an engine control unit 214; a coolant temperature sensor 211 that is mounted on an engine cylinder block and detects an engine coolant temperature; an oxygen concentration sensor 212 that is mounted on an engine exhaust pipe and detects oxygen concentration of an exhaust gas; an ignition key switch 213 that serves as a main switch for starting and stopping the engine; and the engine control unit 214 that controls the air-fuel ratio and ignition for the engine.

According to the preferred embodiment, the oxygen concentration sensor 212 produces an output of a signal proportional to the exhaust air-fuel ratio. It is nonetheless possible that the sensor 212 produces an output of a signal indicating that the exhaust gas is on either a rich side or a lean side with respect to the stoichiometric air-fuel ratio. In addition, though a fuel control is provided by detecting the intake pipe pressure according to the preferred embodiment, the air-fuel ratio control can still be provided by detecting the amount of air taken in by the engine.

Figure 3:
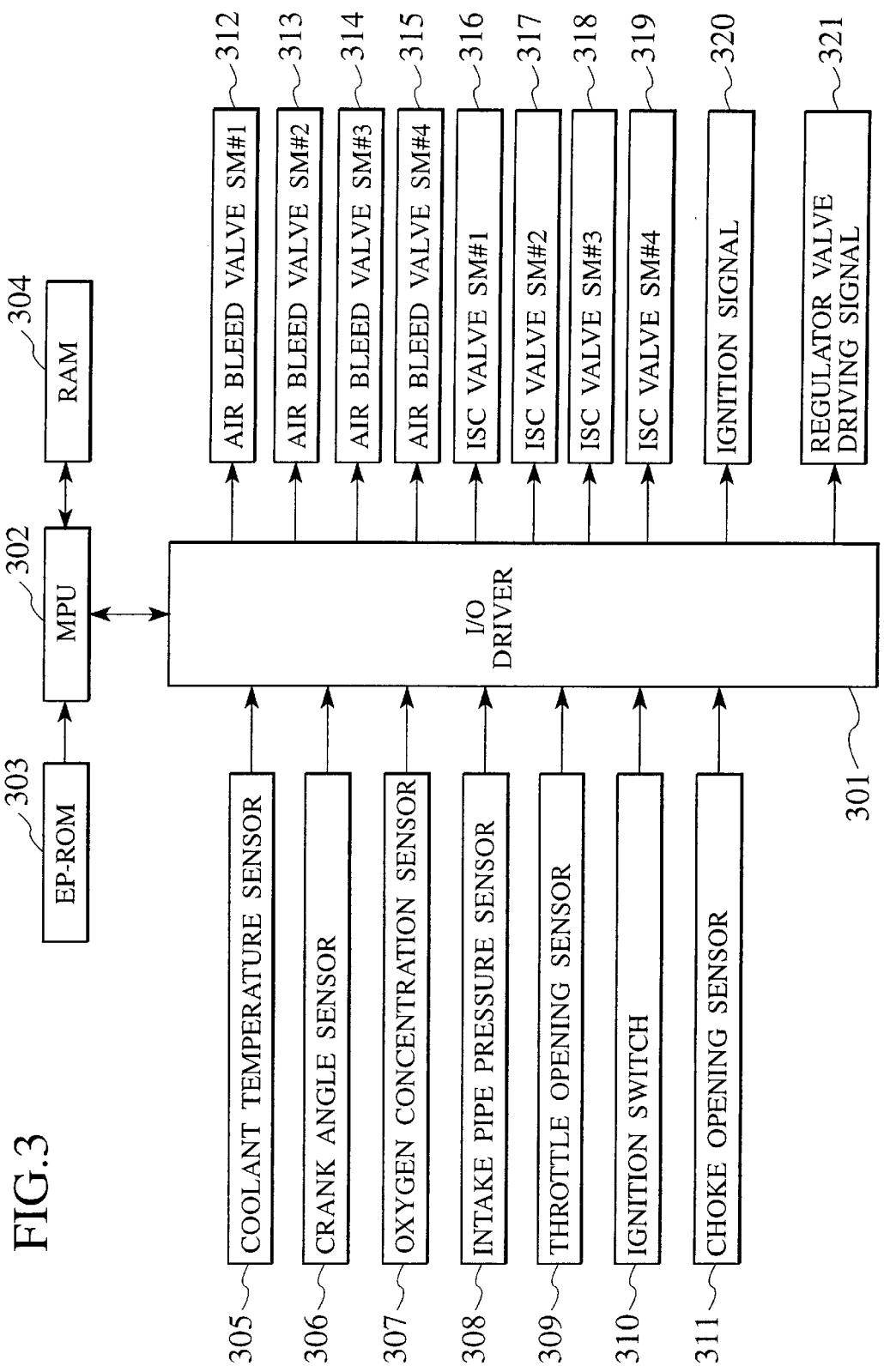
FIG. 3 shows an internal configuration of the fuel control device provided with the idling air-fuel ratio control method of the venturi type fuel supply device according to the preferred embodiment.

FIG. 3 shows the internal configuration of the fuel control device provided with the idling air-fuel ratio control method of the venturi type fuel supply device.

Referring to FIG. 3, the fuel control device is provided with the following components. Namely, an I/O LSI 301 that converts an electrical signal provided by each sensor mounted on the engine to a corresponding signal for digital operations and translates the digital operation control signal to a corresponding actual actuator driving signal; an arithmetic logic unit (MPU) 302 that determines an engine operating condition from the digital operation signal from the I/O LSI 301, calculates the amount of fuel required by the engine, ignition timing, and the like according to a predetermined procedure, and sends the calculated value to the I/O LSI 301; a nonvolatile memory (EP-ROM) 303 that stores therein control procedures and control constants for the arithmetic logic unit 302; and a volatile memory 304 that stores therein results of calculation performed by the arithmetic logic unit 302. A backup battery may be connected to the volatile memory (RAM) 304 so as to retain contents of memory even when power is not supplied the fuel control device with the ignition key switch turned OFF.

FIG. 3 shows a typical application of the fuel control device according to the preferred embodiment of the present invention. In the application, inputs are provided by a coolant temperature sensor 305, a crank angle sensor 306, an oxygen concentration sensor 307, an intake pipe pressure sensor 308, a throttle opening sensor 309, an ignition switch 310, and a choke opening sensor 311. Meanwhile, outputs are provided as air bleed valve opening command values 312 to 315, idle speed control valve opening command values 316 to 319, an ignition signal 320, and a regulator valve driving signal 321.

Figure 4:
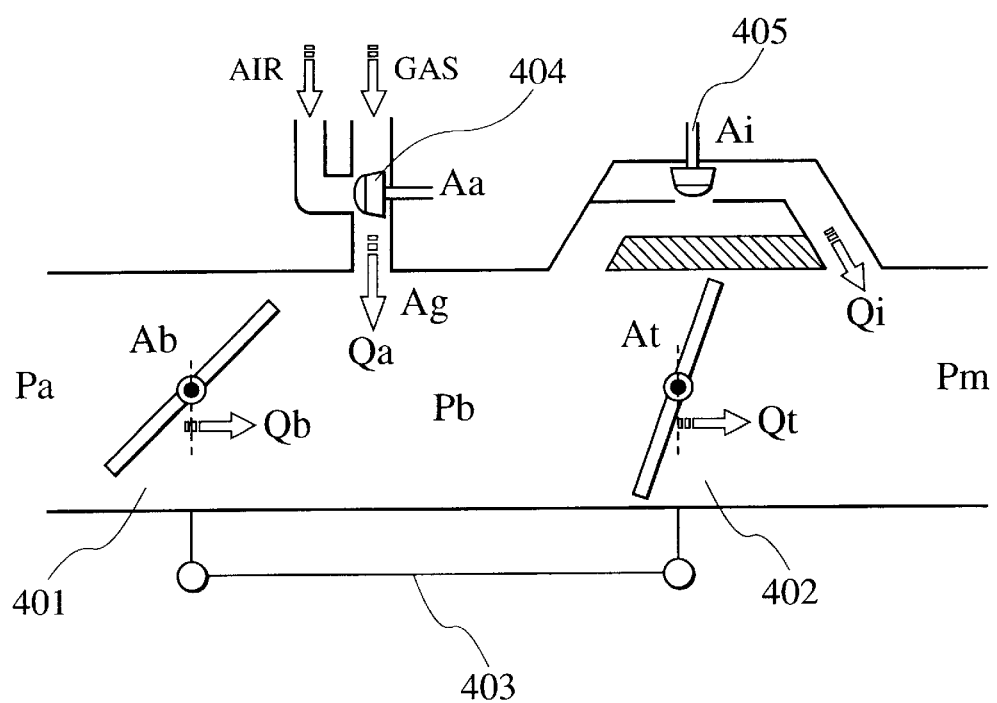
FIG. 4 shows a construction of an area around a venturi chamber between a choke valve and a throttle valve of the venturi type fuel supply device according to the preferred embodiment.

FIG. 4 shows the construction of an area around a venturi chamber between a choke valve and a throttle valve of the venturi type fuel supply device.

Referring to FIG. 4, a choke valve 401 and a throttle valve 402 are operatively connected to each other through a mechanical linkage 403. The mechanical linkage 403 is set so as to generate in the venturi chamber a negative pressure that allows a mixture gas to be taken in during idling. A passage is provided in the venturi chamber. The passage is provided therein with an air bleed valve 404 that determines the mixture ratio of the fuel gas and air of the fuel mixture gas. Another passage is provided so as to bypass the throttle valve 402. An ISC valve 405 controls the flow path area of this passage. A venturi passing air flow rate Qb and a fuel mixture gas flow rate Qa depend on a venturi negative pressure Pb, and a throttle passing flow rate Qt and an ISC valve passing flow rate Qi depend on an intake pipe pressure Pm. Further, quantities representing different conditions in and around the venturi chamber present a relationship expressed by equations (1) through (6) below.

$$\Delta Pb = (Qb + Qa - (Qt + Qi)) \cdot \frac{R \cdot T}{Vb} \tag{1}$$

$$Pb = \sum (Qb + Qa - (Qt + Qi)) \cdot \frac{R \cdot T}{Vb} \tag{2}$$

$$Qb = Ab \cdot K1 \cdot (Pa - Pb)^{\frac{1}{\kappa}} \cdot \sqrt{\frac{2}{\kappa - 1} \cdot (Pa - Pb)^{\frac{\kappa-1}{\kappa}}} \tag{3}$$

$$Qa = Ag \cdot K1 \cdot (Pa - Pb)^{\frac{1}{\kappa}} \cdot \sqrt{\frac{2}{\kappa - 1} \cdot (Pa - Pb)^{\frac{\kappa-1}{\kappa}}} \tag{4}$$

$$Qt = At \cdot K2 \tag{5}$$

$$Qi = Ai \cdot K2 \tag{6}$$

Pa: Atmospheric pressure
Pb: Venturi pressure
Pm: Intake manifold pressure
Ab: Choke valve opening
Ag: Fuel mixture gas supply port opening area
At: Throttle opening area
Ai: ISC valve opening area
R: Gas constant
T: Intake air temperature
Vb: Throttle-to-choke volume
K: Ratio of the specific heat The equation (1) represents a pressure fluctuation of the venturi chamber per unit time.

The equation (2) represents the pressure in the venturi chamber.

The equation (3) represents the amount of air passing by the choke valve.

The equation (4) represents the fuel mixture gas flow rate Qa.

The equation (5) represents the throttle passing flow rate.

The equation (6) represents the ISC valve passing flow rate.

The foregoing equations (1) through (6) indicate that a change in the ISC valve passing flow rate Qi changes the venturi chamber pressure, which changes the fuel mixture gas flow rate Qa, which fluctuates the engine exhaust air-fuel ratio.

Figure 5:
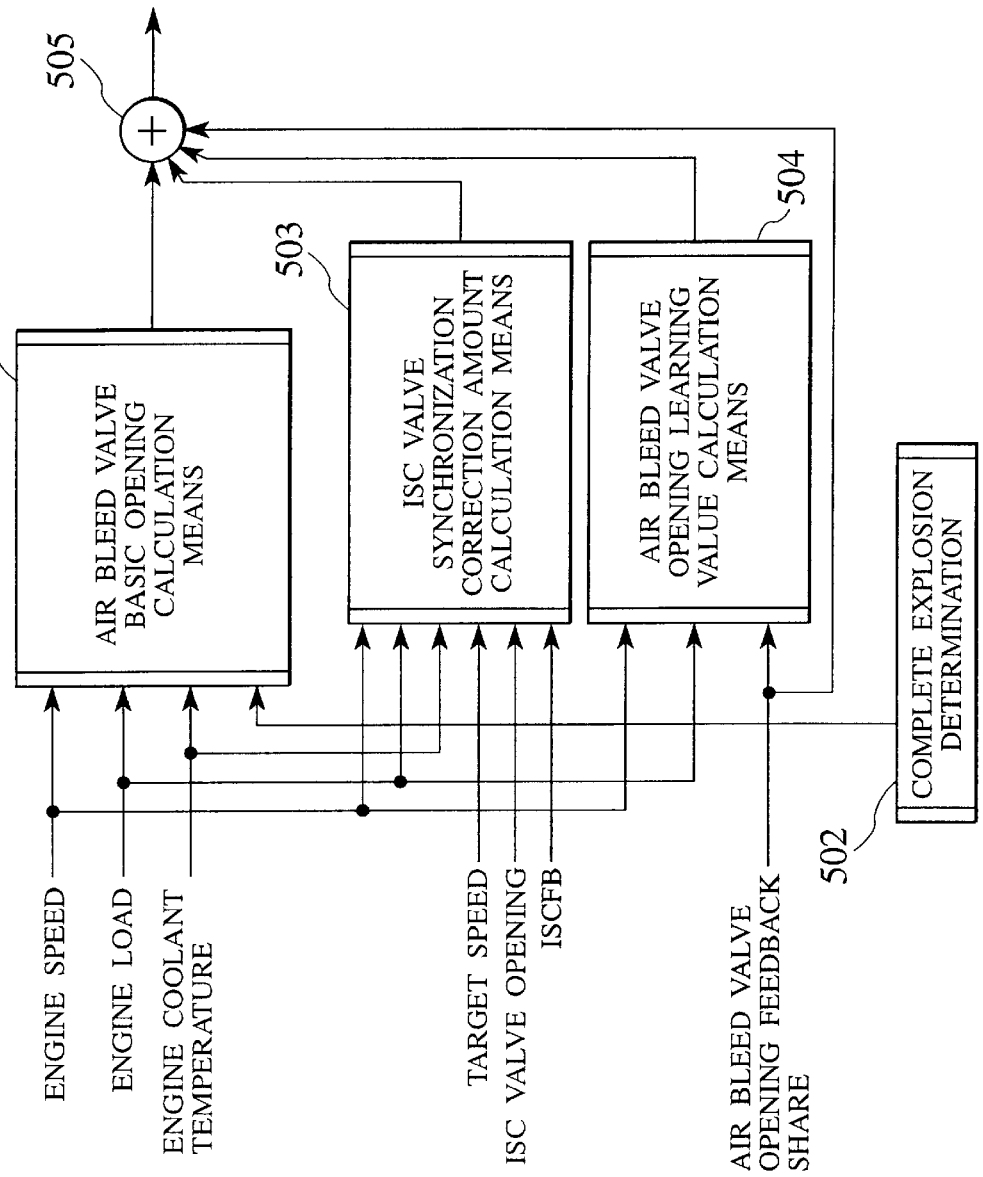
FIG. 5 shows an air bleed valve basic opening calculation block and an opening correction value calculation block of the engine fuel control device according to the preferred embodiment.

FIG. 5 shows an air bleed valve basic opening calculation block and an opening correction value calculation block.

Referring to FIG. 5, a block 501 calculates the air bleed valve basic opening during starting and complete explosion based on an engine speed, an engine load, an engine coolant temperature, and a complete explosion determination signal output from a block 502. The block 502 determines that an explosion is completed (complete explosion) based on mainly whether the engine speed, which increases during starting, exceeds a threshold value or the like. The details of how the block 502 makes a decision of the complete explosion will be omitted.

A block 503 calculates an ISC valve synchronization correction amount based on an engine speed, an engine load, an engine coolant temperature, an ISC valve target speed, an ISC valve opening, and an ISC valve feedback amount (which is indicated in FIG. 5 as ISCFB). A block 504 learns the air bleed valve opening based on an engine speed, an engine load, and an air bleed valve opening feedback value. The block 504 stores the data through a volatile memory map composed of an axis of the engine speed and an axis of the engine load. Storage of data is accomplished by shifting a deviation from a central value of the air bleed valve opening feedback value into the volatile memory map. A block 505 adds up the air bleed valve basic opening, the ISC valve synchronization correction amount, the air bleed valve opening learning value, and the air bleed valve opening feedback value to output a final air bleed valve opening.

Figure 6:
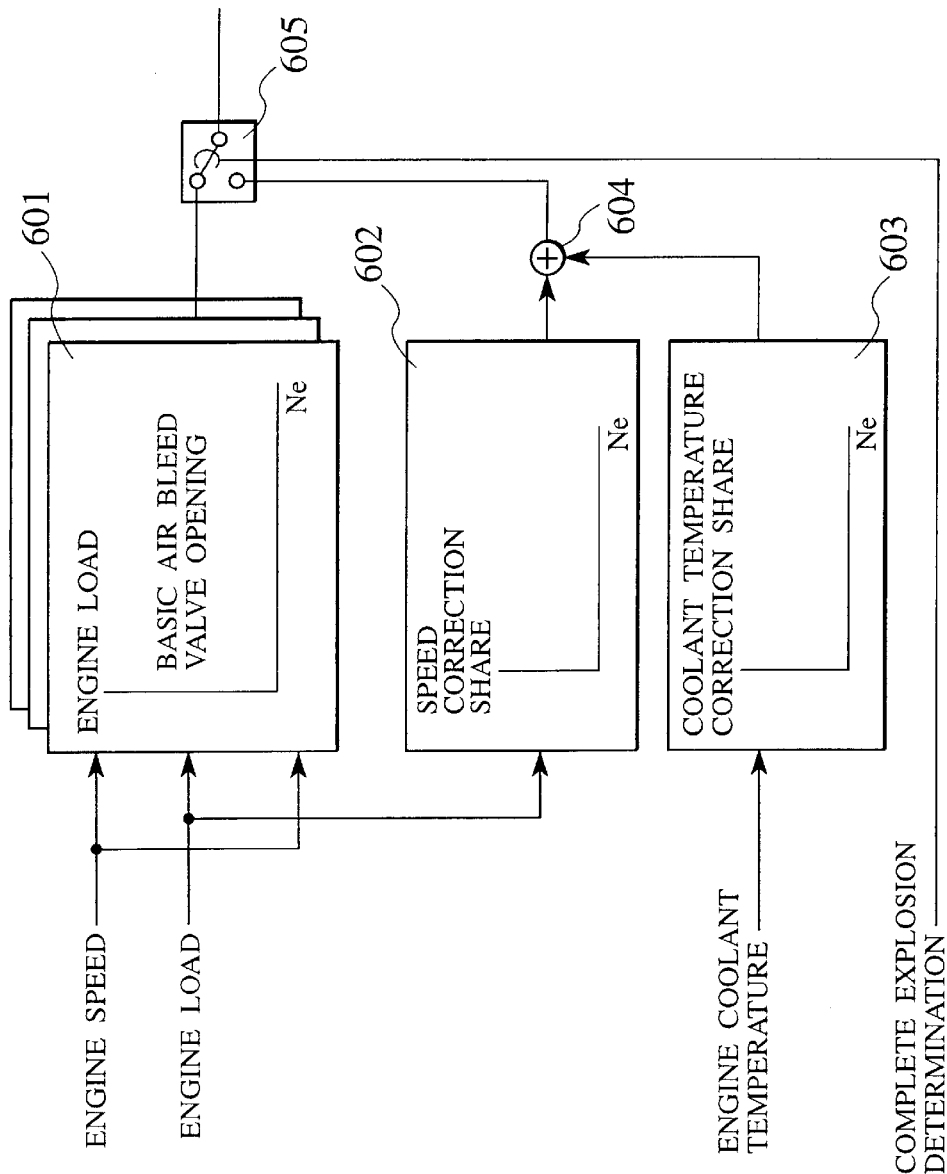
FIG. 6 shows a detailed configuration of the air bleed valve basic opening calculation block of the engine fuel control device according to the preferred embodiment.

FIG. 6 shows a detailed configuration of the air bleed valve basic opening calculation block shown in FIG. 5.

Referring to FIG. 6, a block 601 represents an opening map used to determine the air bleed valve basic opening after the completion explosion. The set air bleed valve opening map is searched through with an engine speed and an engine load used as keys. According to the preferred embodiment, there are a plurality of opening maps that are set in consideration of the possibility that the various types of loads including engine auxiliaries are turned ON or OFF. Blocks 602 and 603 represent calculation values of the air bleed valve basic opening before the complete explosion. The block 602 is a table of speed correction shares searched through with the increased engine speed before the complete explosion used as the key. The block 603 is a table of coolant temperature correction shares searched through with the engine coolant temperature used as the key. The speed correction share and the coolant temperature correction share are added up by an adder 604, thus serving as the air bleed valve basic opening before the complete explosion. The air bleed valve basic opening before or after the complete explosion is properly selected by a switch 605 based on a complete explosion determination signal and output accordingly.

Figure 7:
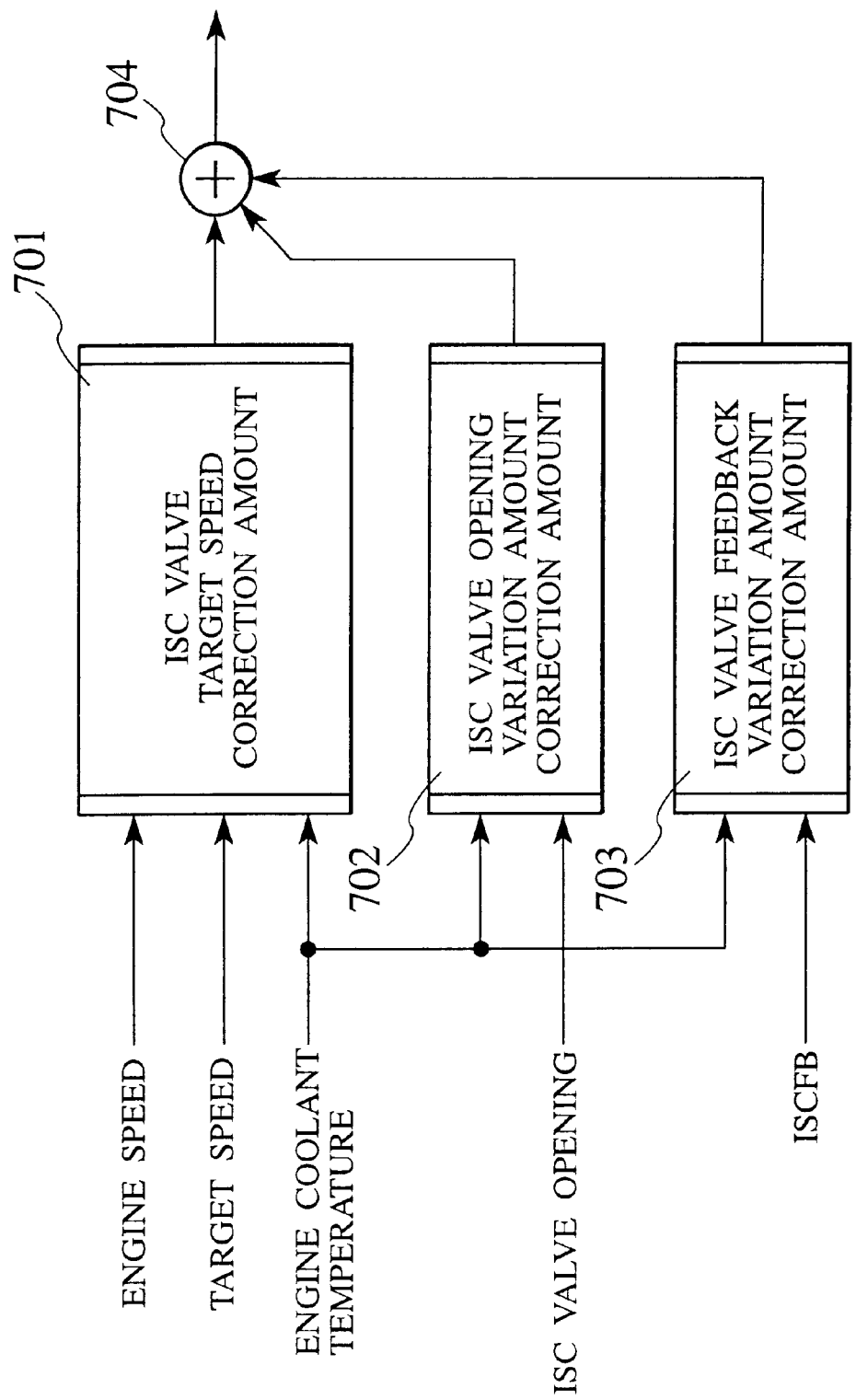
FIG. 7 shows a detailed configuration of the ISC valve synchronization correction amount calculation block of the engine fuel control device according to the preferred embodiment.

FIG. 7 shows a detailed configuration of the ISC valve synchronization correction amount calculation block shown in FIG. 5. Referring to FIG. 7, a block 701 calculates an ISC valve target speed correction amount based on an engine speed, an ISC valve target speed, and an engine coolant temperature. A block 702 calculates an ISC valve opening variation amount correction amount based on an engine coolant temperature and an ISC valve opening. A block 703 calculates an ISC valve feedback variation amount correction amount based on an engine coolant temperature and an ISC valve feedback amount. An adder 704 adds up the calculated speed correction amount, the opening variation amount correction amount, and the feedback variation amount correction amount to provide an output as the ISC valve synchronization correction amount.

Figure 8:
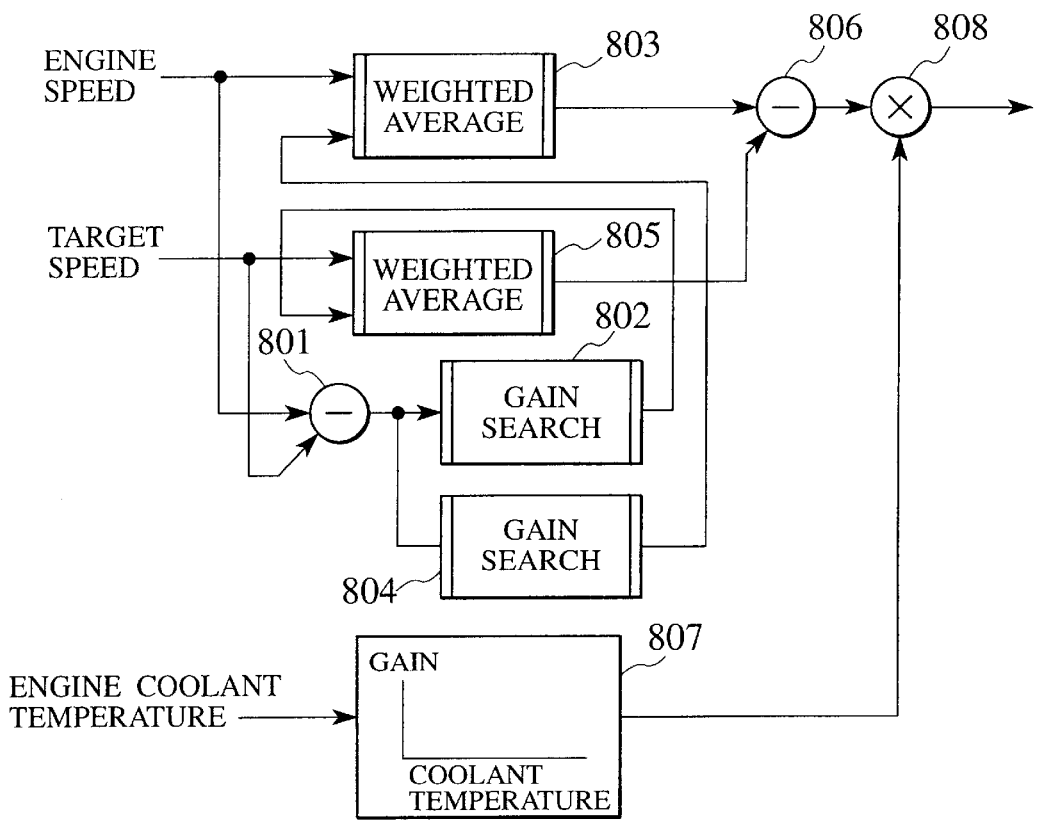
FIG. 8 shows a detailed configuration of the ISC valve target speed correction amount calculation block of the engine fuel control device according to the preferred embodiment.

FIG. 8 shows a detailed configuration of the ISC valve target speed correction amount calculation block shown in FIG. 7. Referring to FIG. 8, a differentiator of a block 801 calculates a difference value for an engine speed and a target speed that are provided as inputs to the calculation block. A block 802 searches for a gain of a weighted average of the engine speed based on the difference value and a block 803 calculates the weighted average. In the same manner, a block 804 searches for a gain of a weighted average of the target speed based on the difference value and a block 805 calculates the weighted average. Details of the weighted average according to the preferred embodiment of the present invention are omitted. Suffice it to say that the weighted average is calculated mainly through filtering or the like by means of a weighted sum of a current input and a previous output.

A differentiator 806 calculates a difference of each weighted average value of the engine speed and the target speed. A block 807 is a table of gains searched through with an engine coolant temperature used as the key. A multiplier 808 then multiplies the calculated gain by the difference of the weighted average value and an output is then provided as the ISC valve target speed correction amount.

Figure 9:
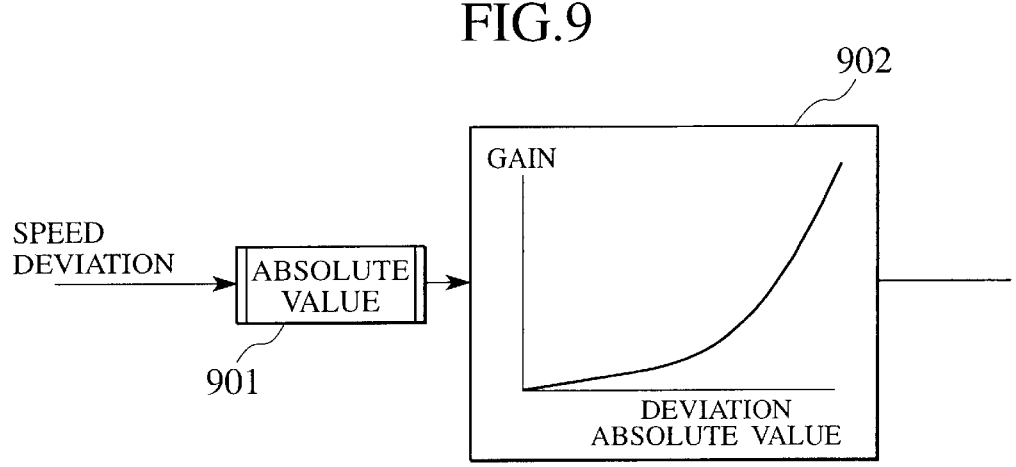
FIG. 9 shows a detailed configuration of the weighted average gain search block of the engine fuel control device according to the preferred embodiment.
Figure 10:
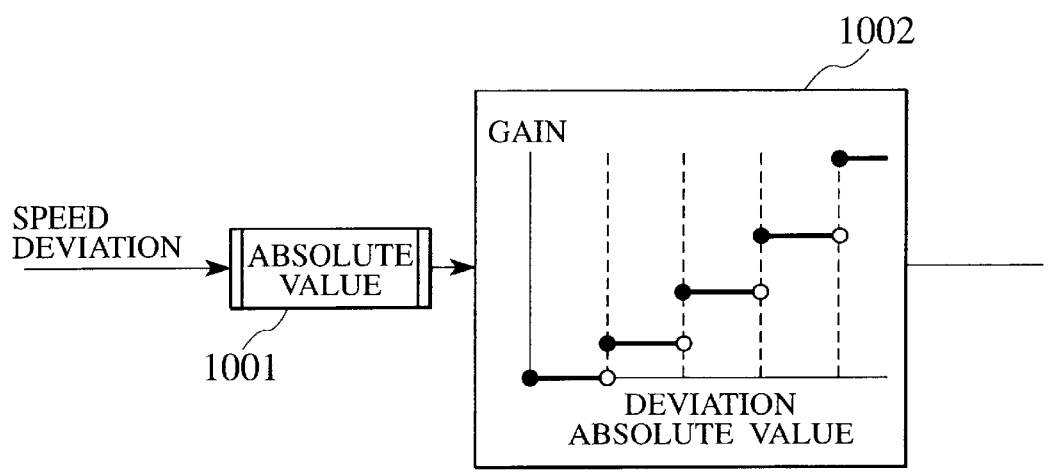
FIG. 10 shows a detailed configuration of the weighted average gain search block of the engine fuel control device according to the preferred embodiment.

FIGS. 9 and 10 show detailed configurations of the blocks for weighted average gain search shown in FIG. 8. In both FIGS. 9 and 10, an absolute value of the difference value (indicated in FIGS. as "speed deviation") is calculated before the gain search. After the absolute value has been calculated, the gain table is searched through. In the example shown in FIG. 9, the gain table is formed as a continuous curve with respect to an absolute value axis, while in the example shown in FIG. 10, the gain table is formed into steps with respect to the absolute value axis. This gain search block is selected arbitrarily according to adaptability and control accuracy of a system, to which it is applied.

Figure 11:
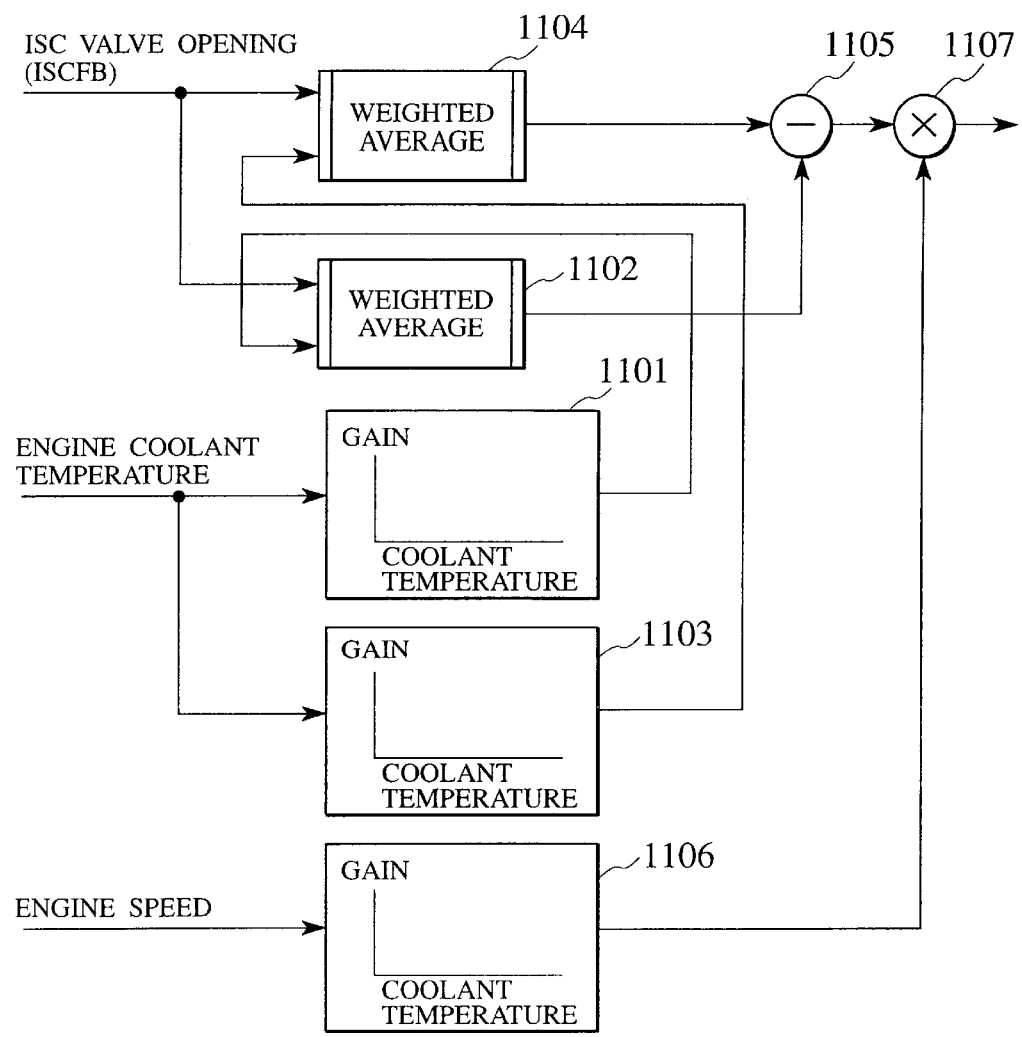
FIG. 11 shows a detailed configuration of the ISC valve opening variation amount correction amount calculation block and the ISC valve feedback variation amount correction amount calculation block of the engine fuel control device according to the preferred embodiment.

FIG. 11 shows a detailed configuration of the ISC valve opening variation amount correction amount calculation block and the ISC valve feedback variation amount correction amount calculation block shown in FIG. 7. Since the ISC valve opening variation amount correction amount calculation block is of the same configuration as the ISC valve feedback variation amount correction amount calculation block, the ISC valve opening variation amount correction amount calculation block as embodied in the preferred embodiment of the present invention is representative.

A block 1101 searches for a first gain through the table with the engine coolant temperature used as the key. A block 1102 calculates a first weighted average of the ISC valve opening. In the same manner, a block 1103 searches for a second gain through the table with the engine coolant temperature used as the key and a block 1104 calculates a second weighted average of the ISC valve opening. A differentiator 1105 then calculates each difference value of the first and the second weighted averages. A block 1106 searches for a gain through the table with the engine speed used as the key and a multiplier 1107 multiplies the gain by the difference value before an output being provided as the ISC valve opening variation amount correction amount.

Figure 12:
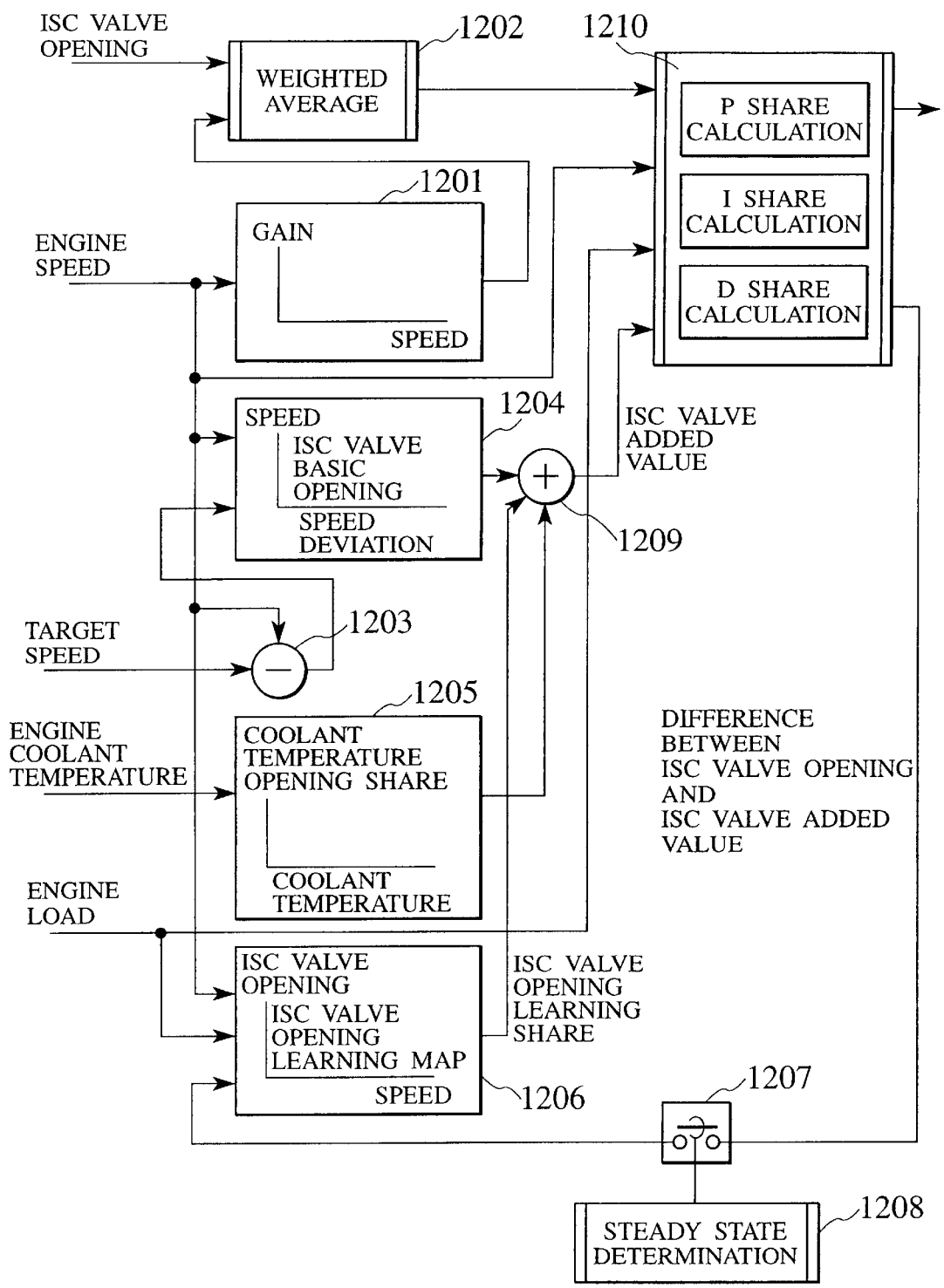
FIG. 12 shows another example of the calculation block for the ISC valve opening variation amount correction amount of the engine fuel control device according to the preferred embodiment.

FIG. 12 shows another example of the calculation, block for the ISC valve opening variation amount correction amount shown in FIG. 7. The example shown in FIG. 12 differs from that shown in FIG. 11 in the following point. Namely, in the example shown in FIG. 11, the difference value between two weighted averages of the ISC valve opening is calculated to detect a variation amount over time for making a correction. While, in the example shown in FIG. 12, the ISC valve basic opening is stored in a map having an axis of deviation between the engine speed and the target speed and in a map having an axis of the engine speed, and a current ISC valve opening is compared against the ISC valve basic opening to calculate the correction amount.

A block 1201 searches for a gain through the table with the engine speed used as the key. A block 1202 calculates the weighted average of the ISC valve opening using the gain. A differentiator 1203 calculates a difference between the engine speed and the target speed. A block 1204 searches for an ISC valve basic opening through the map with the difference and the engine speed used as keys. A block 1205 represents a share of opening as corrected by an engine coolant temperature, or an engine coolant temperature opening share. It is obtained through a table search with the engine coolant temperature used as the key.

A block 1206 represents a share of learning of the ISC valve opening, or an ISC valve opening learning share. It is searched through a volatile memory map with axes of an engine speed and an engine load. An adder 1209 adds up the ISC valve basic opening, the coolant temperature opening share, and the ISC valve opening learning share to arrive at an ISC valve added value. A block 1210 represents a PID feedback calculation of the ISC valve opening variation amount correction amount of the preferred embodiment, calculating the opening variation amount correction amount through PID control when the ISC valve opening follows the ISC valve added value. The block 1210 is to receive inputs of the ISC valve opening, the ISC valve added value following the ISC valve opening, the engine speed, and the engine load. The ISC valve opening learning share is learned as follows. Namely, when a block 1208 determines that the engine is in a steady state, a switch 1207 turns ON and a value on the volatile memory map as the ISC valve opening learning map is replaced by the difference between the ISC valve opening calculated internally by the block 1210 and the ISC valve added value. The block 1208 determines that the engine is in the steady state according to a throttle opening, engine speed fluctuations, ISC valve feedback variation amount, and the like.

Figure 13:
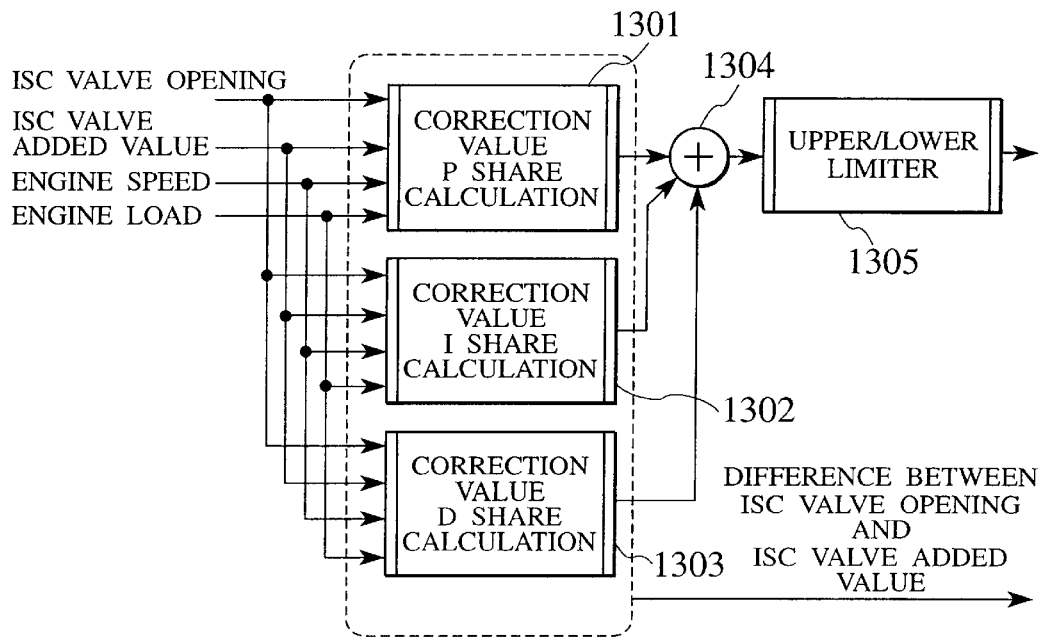
FIG. 13 shows an internal block configuration of the calculation block for PID feedback of the engine fuel control device according to the preferred embodiment.

FIG. 13 shows an internal block configuration of the calculation block for PID feedback shown in FIG. 12.

Referring to FIG. 13, a block 1301 is a calculation block for a P share of a correction value, a block 1302 is a calculation block for an I share of the correction value, and a block 1303 is a calculation block for a D share of the correction value. Each of these blocks receives inputs of the ISC valve opening, the ISC valve added value, the engine speed, and the engine load. An adder 1304 adds up the correction value P share, the correction value I share, and the correction value D share calculated by the corresponding blocks and a block 1305, an upper/lower limiter, gives upper and lower limitations. An output is thereafter provided as the ISC valve opening variation amount correction amount.

Figure 14:
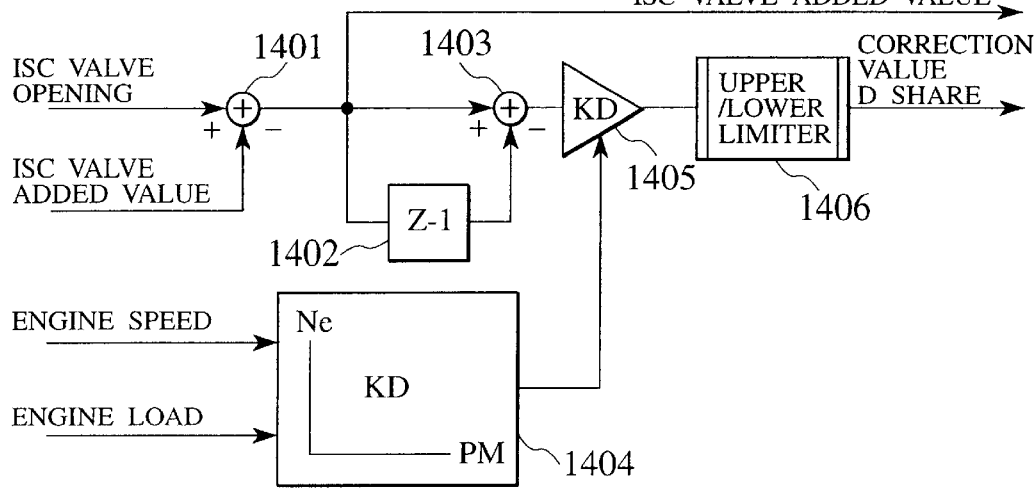
FIG. 14 shows a calculation block for the correction value D share of the PID control of the engine fuel control device according to the preferred embodiment.

FIG. 14 shows a calculation block for the correction value D share of the PID control shown in FIG. 13.

Referring to FIG. 14, an adder 1401 calculates a difference value between the ISC valve opening and the ISC valve added value. An adder 1403 and a delay device 1402 calculate a variation amount per unit time of the difference value. A block 1404 searches for a D share gain through a map with the engine speed and the engine load used as keys. A block 1405 multiplies the variation amount per unit time of the difference value by the D share gain and a block 1406 puts upper/lower limitations. An output of the correction value D share value of the PID control is then provided.

Figure 15:
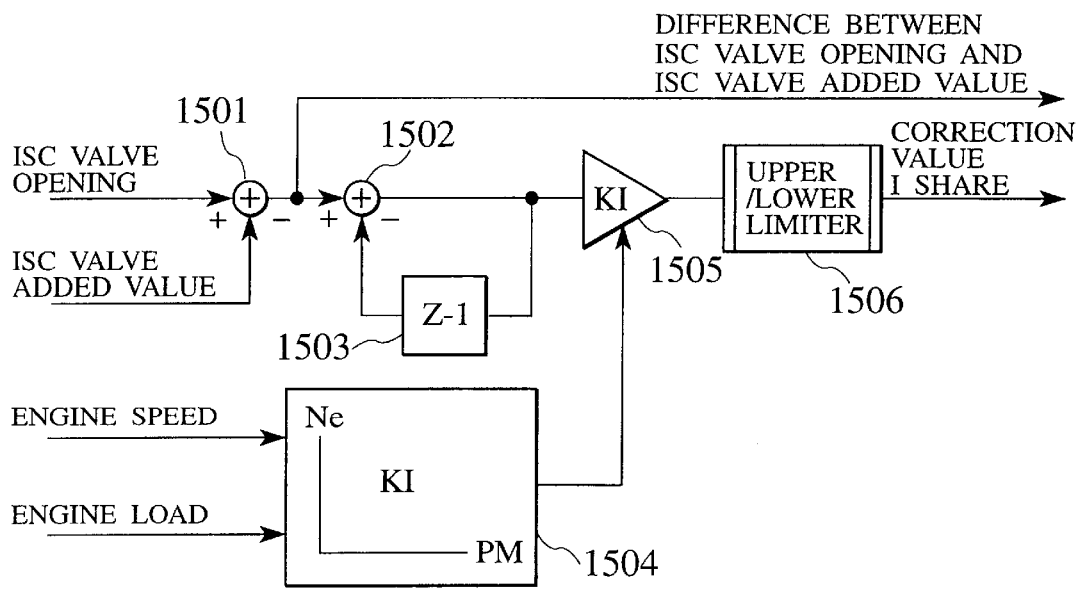
FIG. 15 shows a calculation block for the correction value I share of the PID control of the engine fuel control device according to the preferred embodiment.

FIG. 15 shows a calculation block for the correction value I share of the PID control shown in FIG. 13.

Referring to FIG. 15, an adder 1501 calculates a difference value between the ISC valve opening and the ISC valve added value. An adder 1502 and a delay device 1503 integrate the difference value. A block 1504 searches for an I share gain through a map with the engine speed and the engine load used as keys. A block 1505 multiplies the integrated value by the I share gain and a block 1506 puts upper/lower limitations. An output of the correction value I share value of the PID control is then provided.

Figure 16:
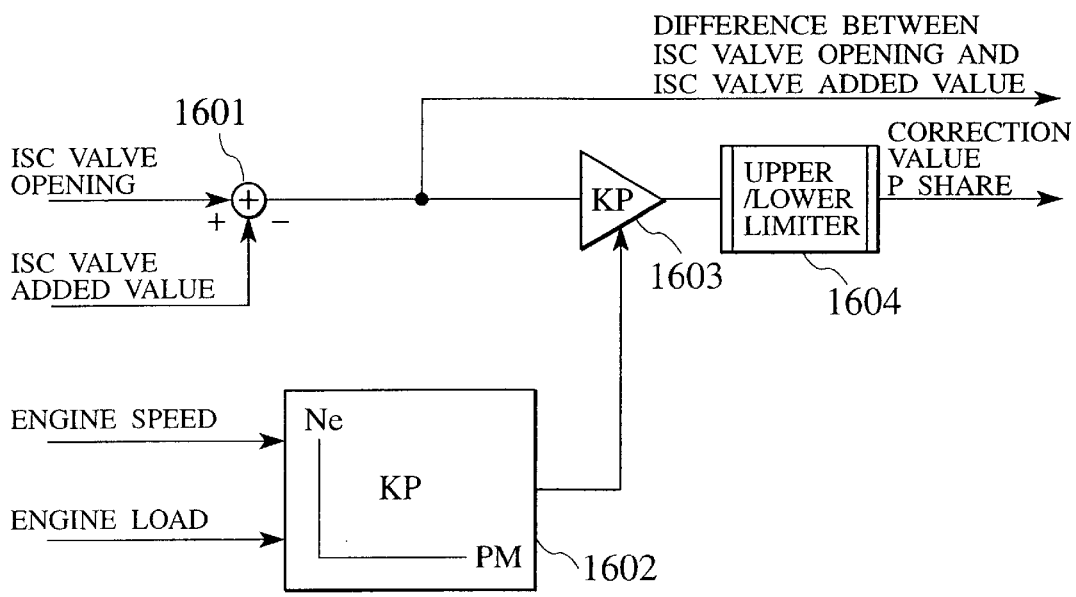
FIG. 16 shows a calculation block for the correction value P share of the PID control of the engine fuel control device according to the preferred embodiment.

FIG. 16 shows a calculation block for the correction value P share of the PID control shown in FIG. 13.

Referring to FIG. 16, an adder 1601 calculates a difference value between the ISC valve opening and the ISC valve added value. A block 1602 searches for a P share gain through a map with the engine speed and the engine load used as keys. A block 1603 multiplies the difference value by the P share gain and an output of the correction value P share value of the PID control is then provided.

In the examples shown in FIGS. 14, 15, and 16, an output of each of the differences between the ISC valve opening and the ISC valve added value required for the ISC valve opening learning share shown in FIG. 12 is provided. There are, however, no practical problems involved as long as an output of at least one of these differences is provided.

FIGS. 17 through 20 are drawings showing timing charts of the exhaust air-fuel ratio of the engine controlled by the fuel control device operating on the control blocks described in the foregoing paragraphs and typical patterns of behavior of engine speed.

Figure 17:
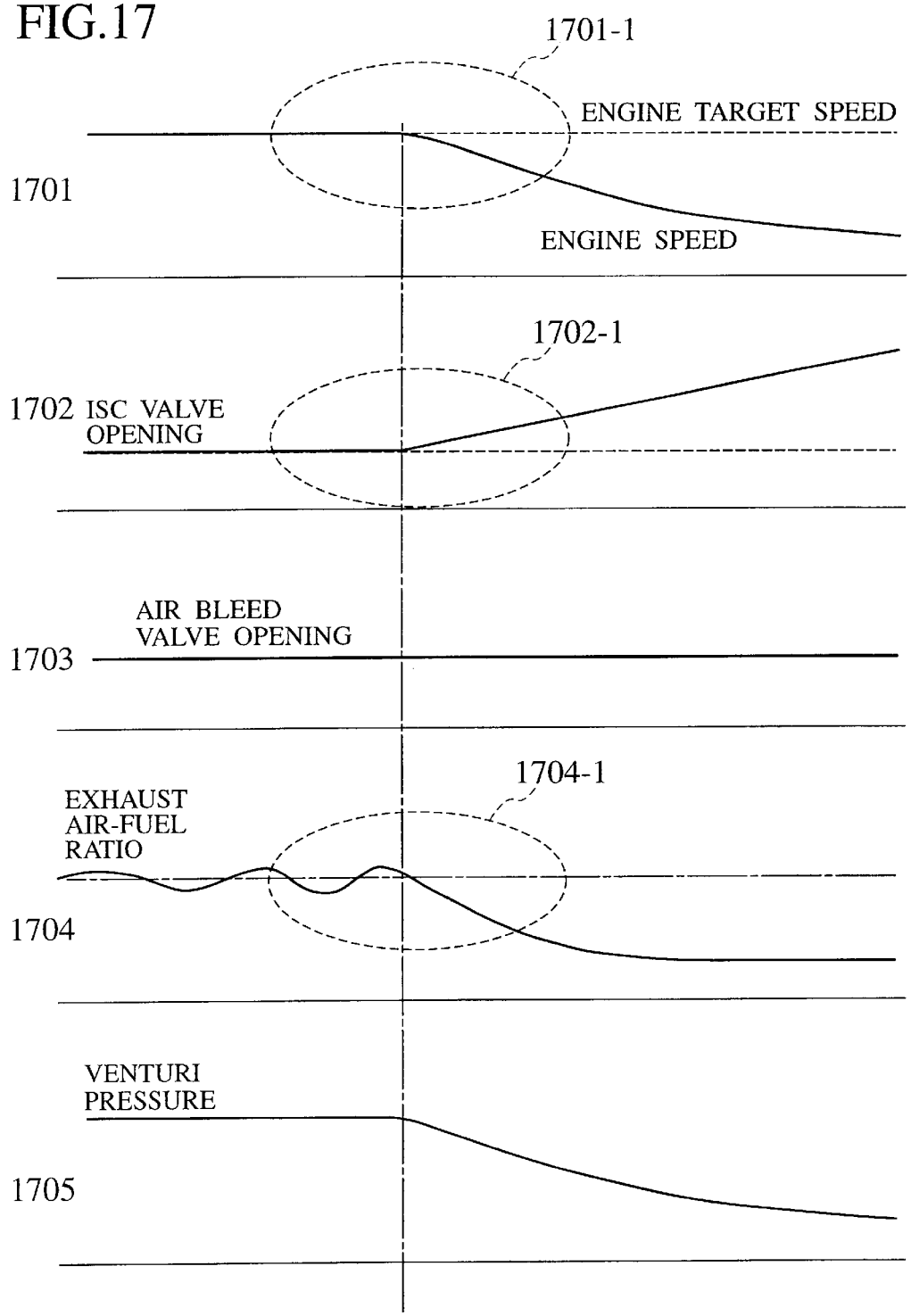
FIG. 17 shows a behavior pattern of the exhaust air-fuel ratio timing chart and the engine speed of an engine controlled by the engine fuel control device according to the preferred embodiment.

FIG. 17 shows a behavior pattern of the engine speed when no idling air-fuel ratio control is provided.

Referring to FIG. 17, chart 1701 shows the behavior pattern of the engine speed, indicating that the engine speed remains lower than a target speed due to a disturbance of some sort in region 1701__1. Chart 1702 shows the ISC valve opening, indicating that the ISC valve opens so as to increase the engine speed to make up for a condition of the reduced engine speed (region 1702__1). Chart 1703 represents the air bleed valve opening. Since the air-fuel ratio control during idling is not provided according to the embodiment, no corrections are made of the opening for the behavior pattern of the ISC valve. Chart 1704 represents the behavior pattern of the engine exhaust air-fuel ratio. It indicates that, with the venturi negative pressure shown in chart 1705 decreasing, the amount of fuel mixture gas increases to gradually develop an over-rich condition (region 1704__1). With this over-rich condition developing, engine combustion is aggravated, thus making the engine unable to increase the speed thereof to the original target level.

Figure 18:
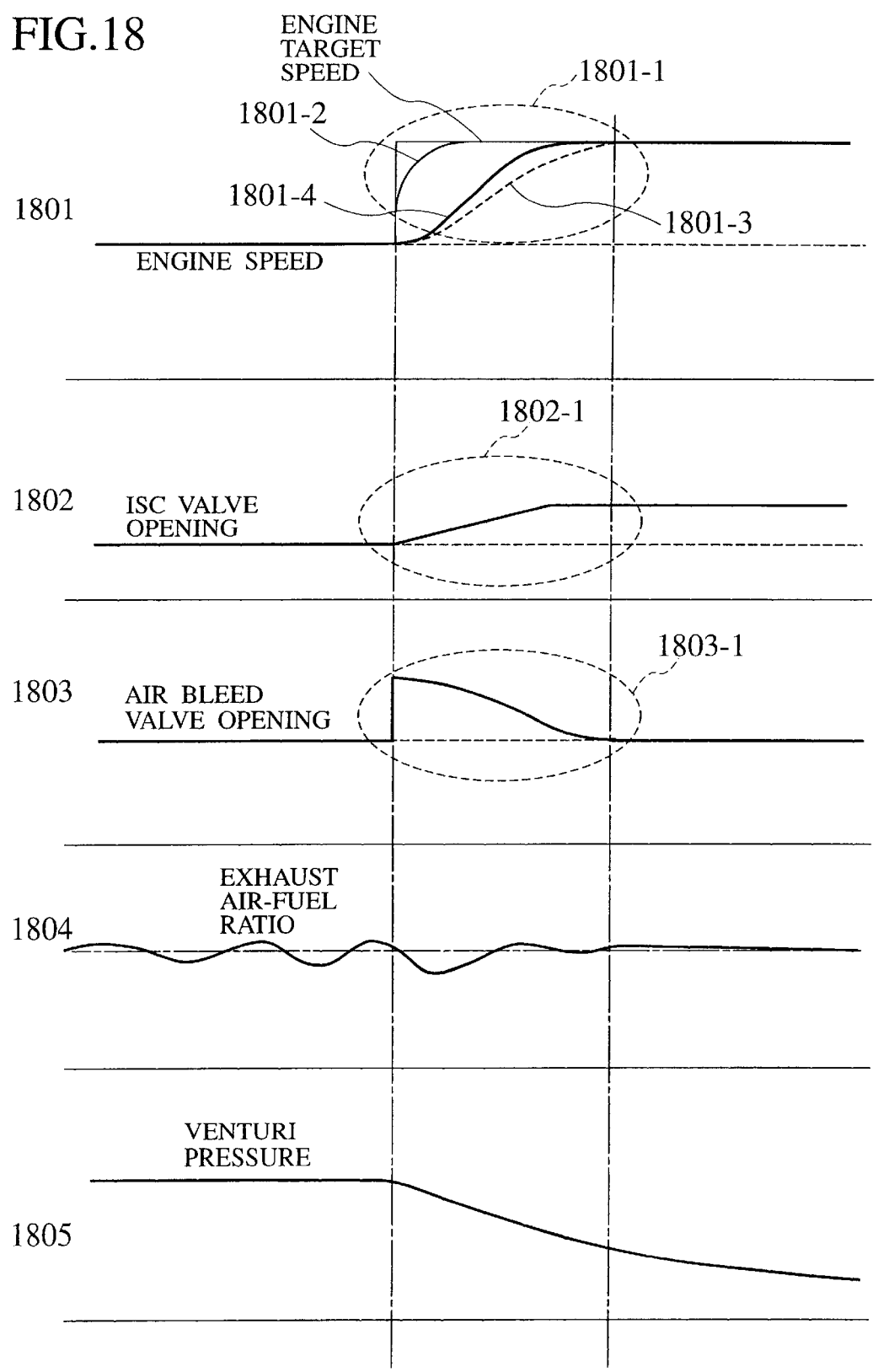
FIG. 18 shows a behavior pattern when the idling air-fuel ratio control is provided for the engine fuel control device according to the preferred embodiment.

FIG. 18 shows a behavior pattern when the idling air-fuel ratio control is provided.

Referring to FIG. 18, chart 1801 shows the behavior pattern of the engine speed, indicating that the target speed of the ISC valve is on the rise starting with region 1801__1. Chart 1801__2 is the weighted average value of the target speed and chart 1801__3 is the weighted average value of the engine speed. Chart 1803 indicates the air bleed valve opening. Unlike the example shown in FIG. 17, control is provided according to the example shown in FIG. 18 so as to bring the air bleed valve opening toward a lean side of the fuel mixture gas in accordance with the change in the target speed in region 1801__1. It thereby responds to the movement of the ISC valve toward an open side as indicated by region 1802__1 of chart 1802. This prevents the exhaust air-fuel ratio shown in chart 1804 from becoming over-rich, thus allowing the engine speed to increase in accordance with the increase in the ISC valve target speed.

Figure 19:
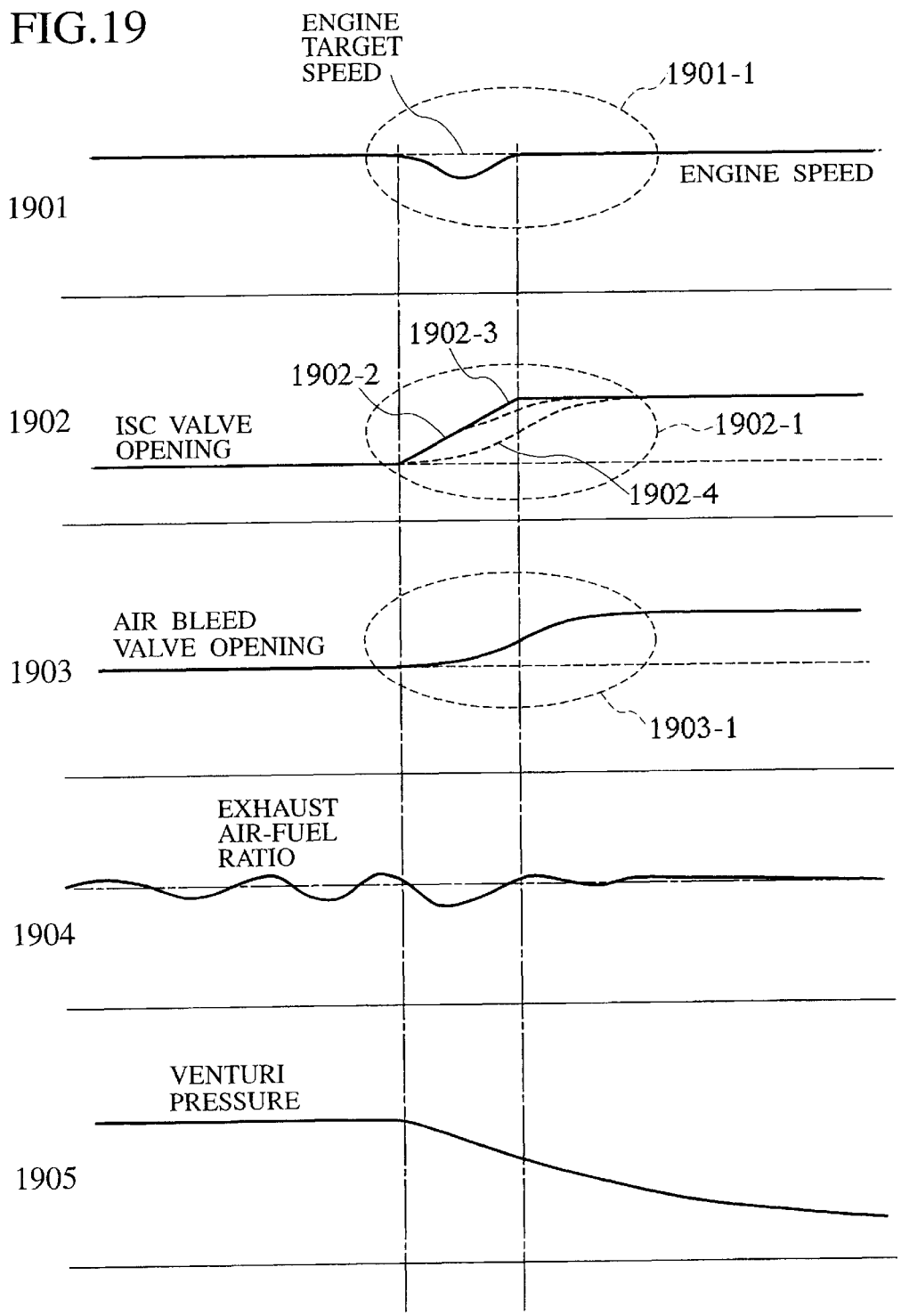
FIG. 19 shows another behavior pattern when the idling air-fuel ratio control is provided for the engine fuel control device according to the preferred embodiment.

FIG. 19 shows another behavior pattern when the idling air-fuel ratio control is provided. It is an example, in which the variation amount correction amount cited in FIG. 11 is mainly used for the control.

Referring to FIG. 19, chart 1901 shows the behavior pattern of the engine speed, indicating that the engine speed remains lower than the target speed due to a disturbance of some sort in region 1901__1. Chart 1902 shows the ISC valve opening, indicating that the ISC valve opening shifts toward the open side in region 1902__1 as the engine speed decreases as noted earlier. Chart 1902__3 is a first weighted average value of an ISC valve opening 1902__2 and chart 1902__5 is a second weighted average value. Chart 1903 indicates the air bleed valve opening. To respond to the difference between the first weighted average value and the second weighted average value, control is provided in region 1901__1 so as to bring the air bleed valve opening toward the lean side of the fuel mixture gas. This prevents the exhaust air-fuel ratio shown in chart 1904 from becoming over-rich, thus allowing the engine to regain its speed as the ISC valve opening shifts toward the open side.

Figure 20:
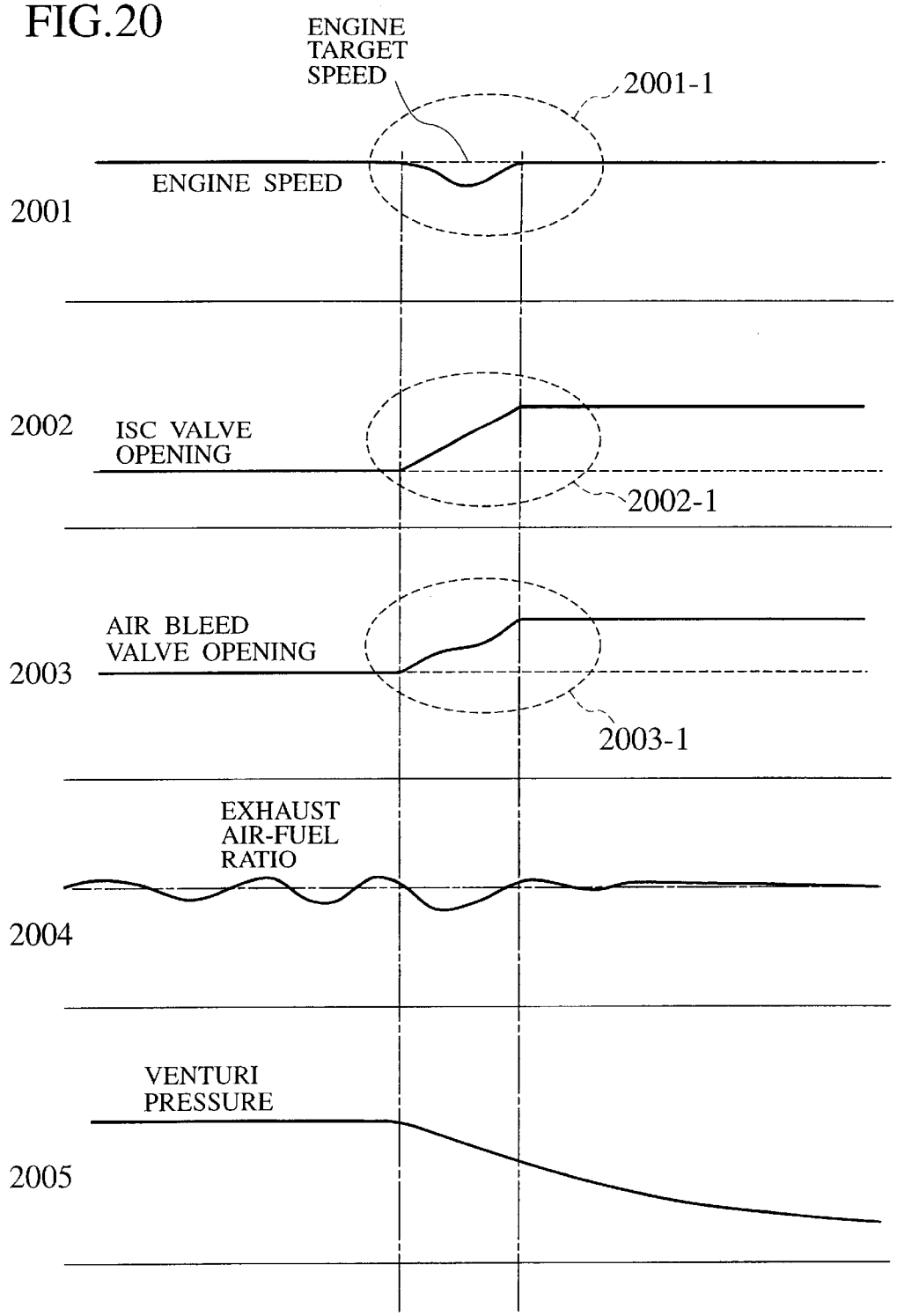
FIG. 20 is still another behavior pattern when the idling air-fuel ratio control is provided according to the preferred embodiment.

FIG. 20 is still another behavior pattern when the idling air-fuel ratio control is provided according to the embodiment. It is an example, in which the variation amount correction amount cited in FIG. 12 is mainly used for the control.

Referring to FIG. 20, chart 2001 shows the behavior pattern of the engine speed, indicating that the engine speed remains lower than the target speed due to a disturbance of some sort in region 2001_1. Chart 2002 shows the ISC valve opening, indicating that the ISC valve opening shifts toward the open side in region 2002_1 as the engine speed decreases as noted earlier. The air bleed valve shown in chart 2003 is controlled so as to bring the air bleed valve opening toward the lean side of the fuel mixture gas as indicated in region 2003_1, as the ISC valve added value follows the ISC valve opening in response to the ISC valve opening shifting toward the open side. This prevents the exhaust air-fuel ratio shown in chart 2004 from becoming over-rich, thus allowing the engine to regain its speed as the ISC valve opening shifts toward the open side.

Figure 21:
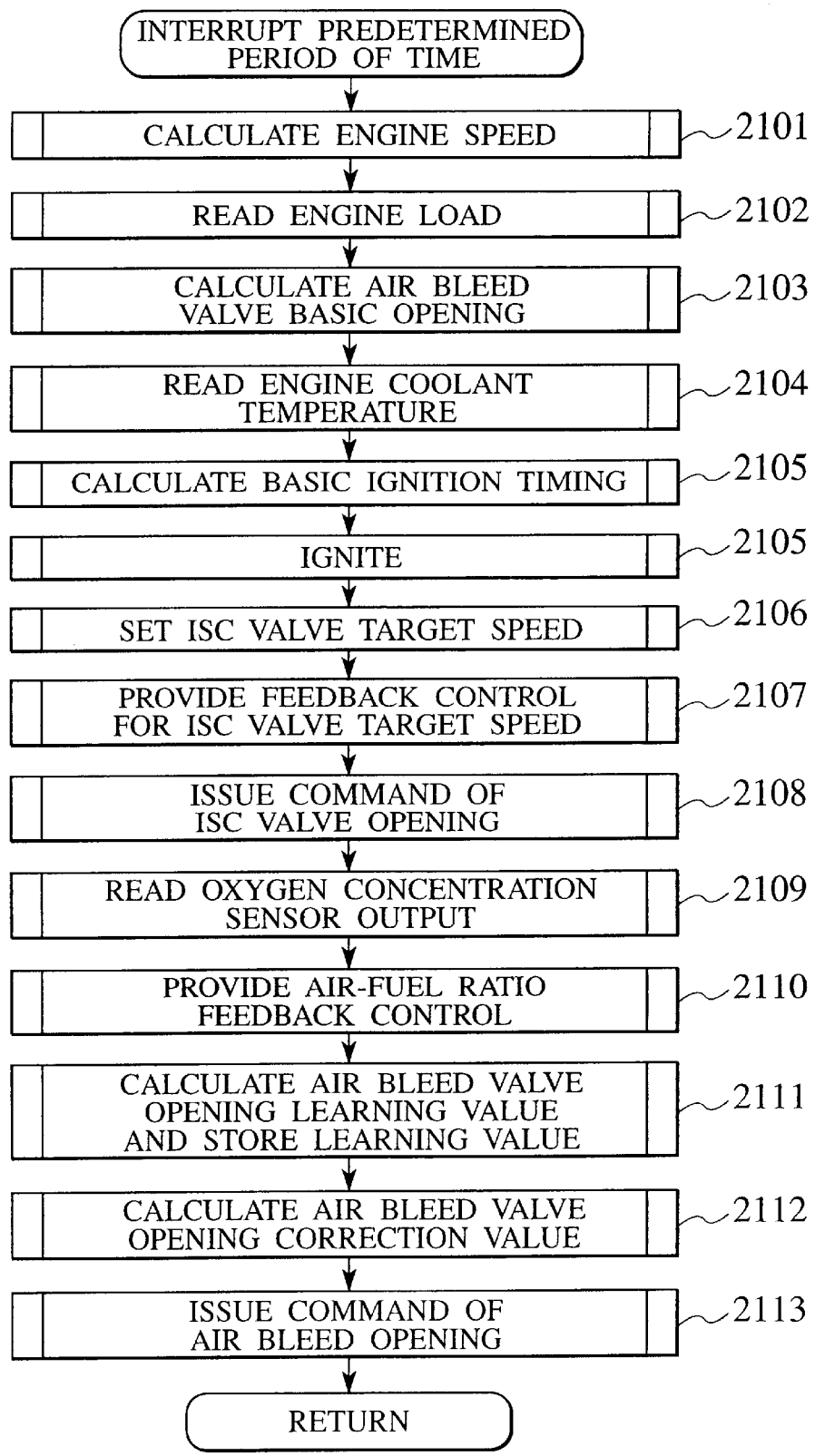
FIG. 21 shows a flowchart of control provided by the fuel control device provided with the idling air-fuel ratio control method of the venturi type fuel supply device according to the preferred embodiment.

FIG. 21 shows a flowchart of control provided by the fuel control device provided with the idling air-fuel ratio control method of the venturi type fuel supply device.

In step 2101, the engine speed is calculated based on a signal provided by the crank angle sensor. In step 2102, the engine load, such as the intake pipe pressure and the like, is read. In step 2013, the air bleed valve basic opening is calculated. In step 2104, the engine coolant temperature according to an output provided by the coolant temperature sensor is read. In step 2105, the basic ignition timing is calculated based on the engine speed, the engine load, and the engine coolant temperature. In step 2106, a target speed during idling is set according to the engine condition. In step 2107, a feedback control is provided for the ISC valve opening so as to achieve the set target idle speed and, in step 2108, a command is issued for the ISC valve opening. In step 2109, the output from the oxygen concentration sensor mounted to the exhaust pipe of the engine is read and, in step 2110, an air-fuel ratio feedback control is provided according to the reading of the oxygen concentration sensor output. In step 2111, the air bleed valve opening learning value based on the result of the air-fuel ratio feedback control is calculated and stored accordingly. In steps 2112 and 2113, the air bleed valve opening correction value is calculated based on the ISC valve control-related information and a command is issued for the air bleed valve opening. A sequence of these operations is executed at every predetermined period of time according to the embodiment. It may nonetheless be executed by an event request from the engine, for example, at every predetermined crank angle.

Figure 22:
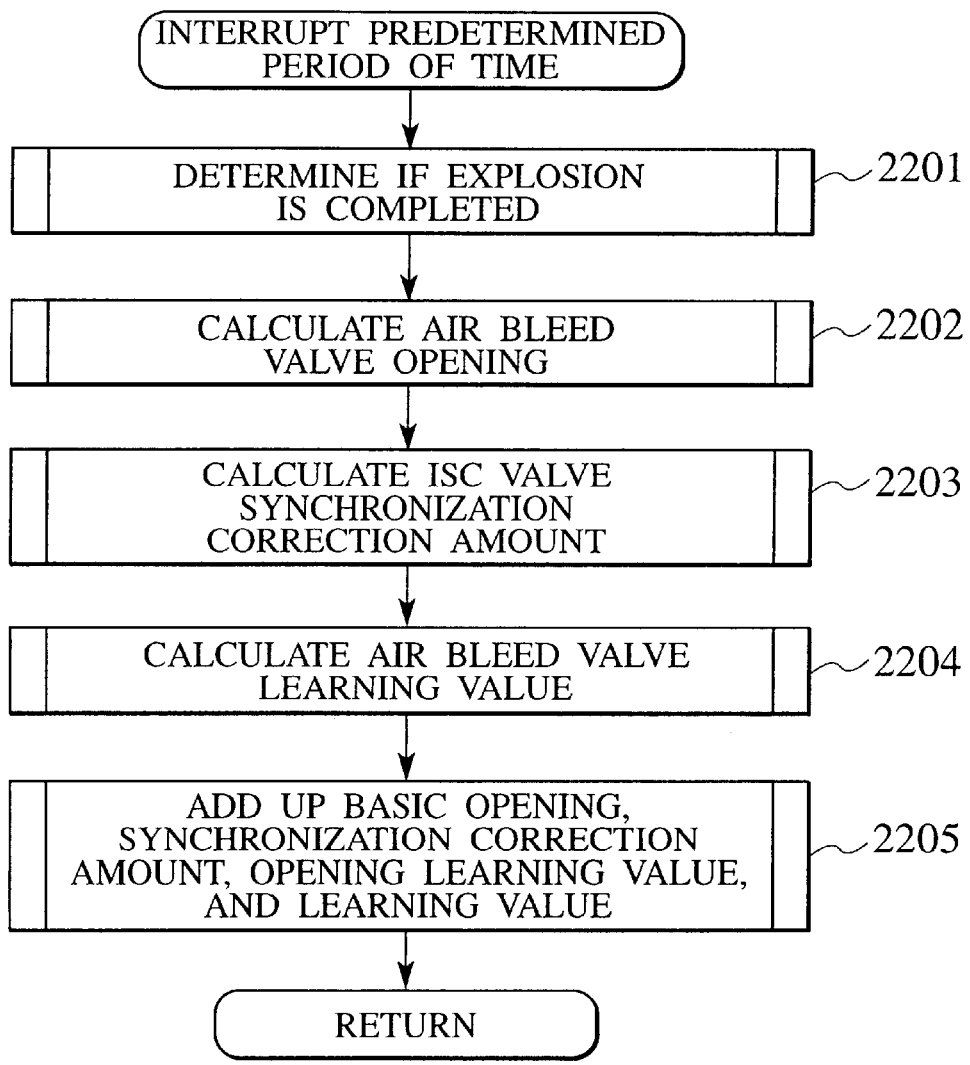
FIG. 22 is an entire flowchart for the air bleed valve basic opening calculation block and the opening correction value calculation block of the engine fuel control device according to the preferred embodiment.

FIG. 22 is an entire flowchart for the air bleed valve basic opening calculation block and the opening correction value calculation block shown in FIG. 5.

In step 2201, an evaluation is made to determine whether a complete explosion has been achieved of the engine according to the engine speed during starting. In step 2202, the air bleed valve basic opening is calculated. In step 2203, the ISC valve synchronization correction amount with respect to the air bleed valve basic opening is calculated. In step 2204, the air bleed valve opening learning value is calculated according to the share of the air bleed valve feedback identified through the feedback control by the oxygen concentration sensor. In step 2205, the basic opening, the synchronization correction amount, the opening learning value, and the feedback share are added up to calculate a final air bleed valve opening.

Figure 23:
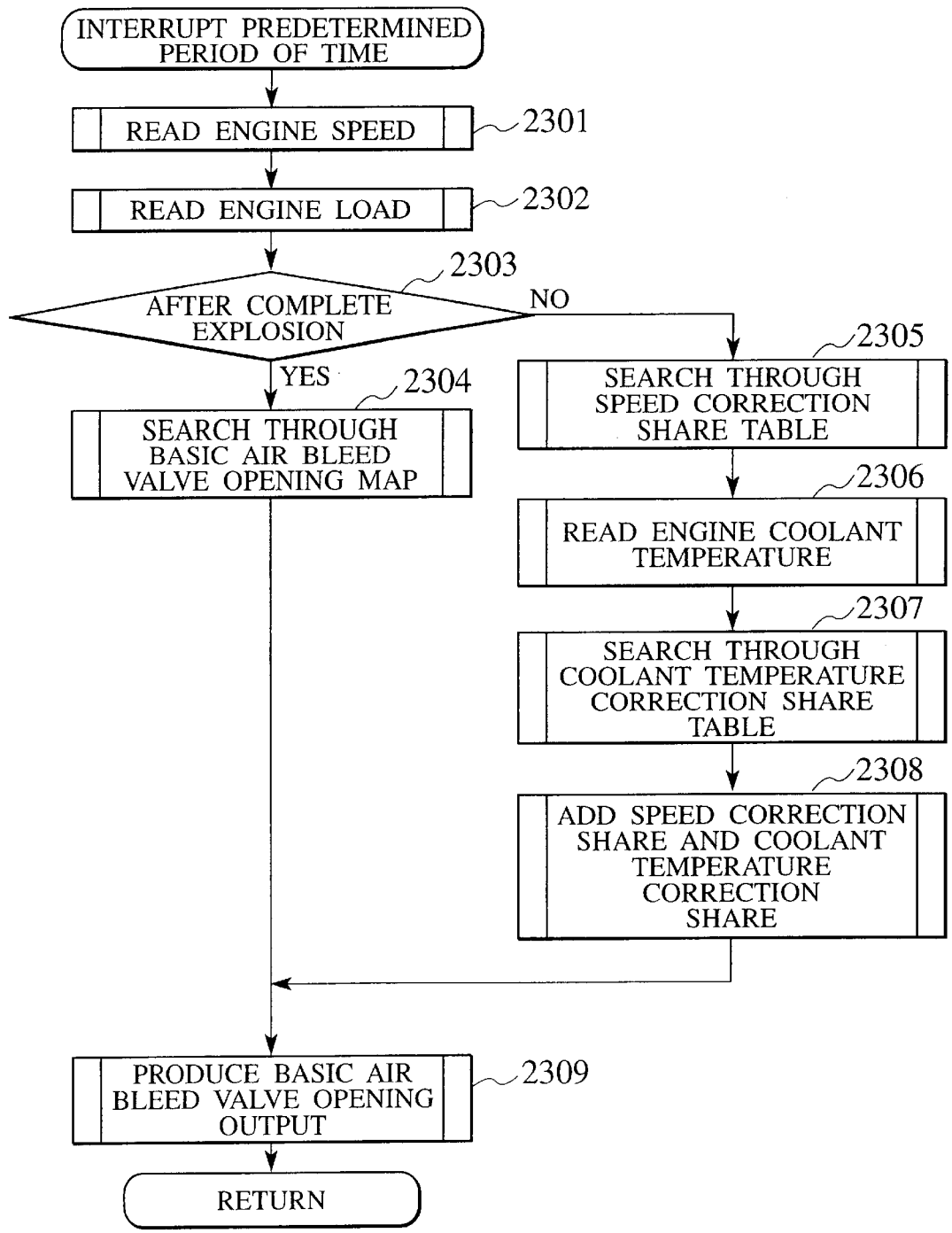
FIG. 23 is a flowchart for the air bleed valve basic opening calculation block of the engine fuel control device according to the preferred embodiment.

FIG. 23 is a flowchart for the air bleed valve basic opening calculation block shown in FIG. 6.

In step 2301, the engine speed is read. In step 2302, the engine load is read. In step 2303, it is determined whether the engine is in a complete explosion state or not. If it is determined that the engine is in the complete explosion state, a search is done through a map for the basic air bleed valve opening in step 2304. If it is determined that the engine is not in the complete explosion state in step 2303, then a search is done through a table for the share of the engine speed correction and the share of the coolant temperature correction with respect to the air bleed valve opening in steps 2305, 2306, 2307, and 2308. The sum of these parameters is the basic air bleed valve opening. In step 2309, an output is produced of the basic air bleed valve opening corresponding to the complete explosion or an incomplete explosion state.

Figure 24:
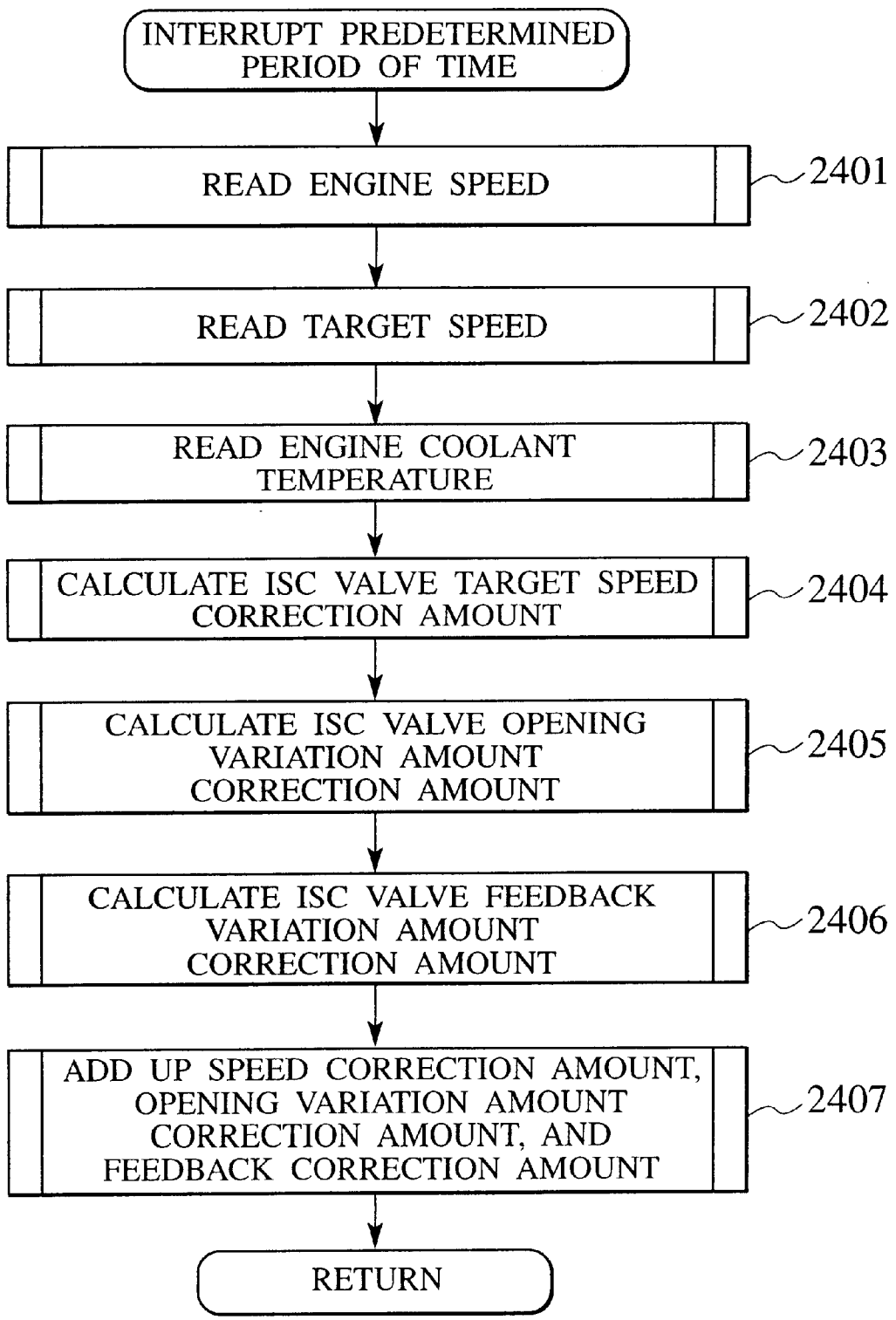
FIG. 24 is a flowchart for the ISC valve synchronization correction amount calculation block of the engine fuel control device according to the preferred embodiment.

FIG. 24 is a flowchart for the ISC valve synchronization correction amount calculation block shown in FIG. 7.

In step 2401, the engine speed is read. In step 2402, the ISC valve target speed is read. In step 2403, the engine coolant temperature is read. In step 2404, the ISC valve target speed correction amount is calculated. In step 2405, ISC valve opening variation amount correction amount is calculated. In step 2406, the ISC valve feedback variation amount correction amount is calculated. In step 2407, the target speed correction amount, the opening variation amount correction amount, and the feedback variation amount correction amount are added up and an output of the sum is provided as the ISC valve target speed correction amount.

Figure 25:
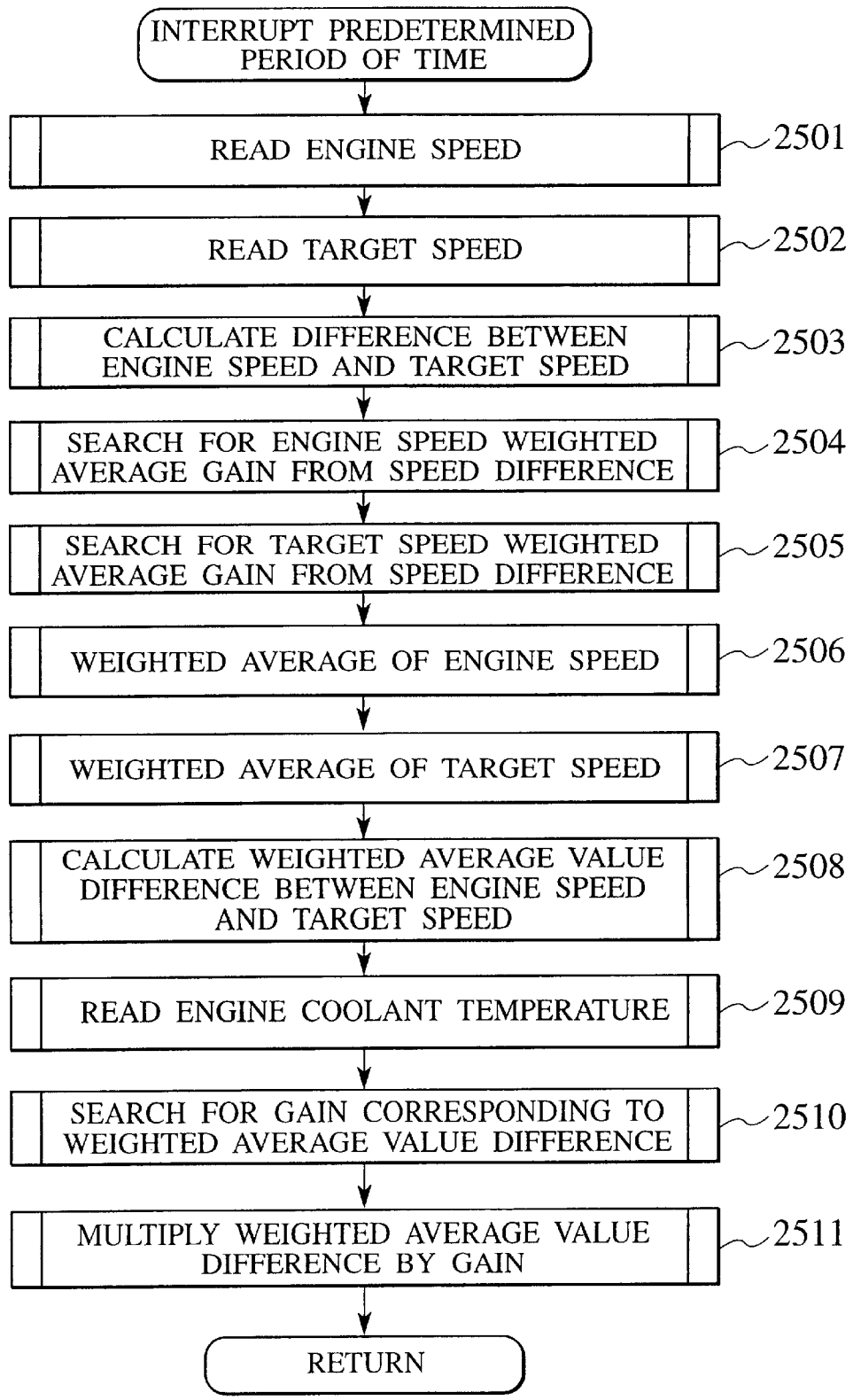
FIG. 25 is a flowchart for the ISC valve target speed correction amount calculation block of the engine fuel control device according to the preferred embodiment.

FIG. 25 is a flowchart for the ISC valve target speed correction amount calculation block shown in FIG. 8.

In step 2501, the engine speed is read. In step 2502, the ISC valve target speed is read. In step 2503, the difference between the engine speed and the target speed is calculated. In steps 2504, 2505, 2506, and 2507, a search is done for a weighted average gain for each of the differences between the corresponding pair of the engine speeds and target speeds and a weighted average is obtained. In step 2508, the difference in the weighted average values is calculated between the engine speed and the target speed. In steps 2509 and 2510, a search is done through a table for a gain of the difference with respect to the engine coolant temperature. In step 2511, the weighted average value difference is multiplied by the gain and an output is provided as the ISC valve target speed correction amount.

Figure 26:
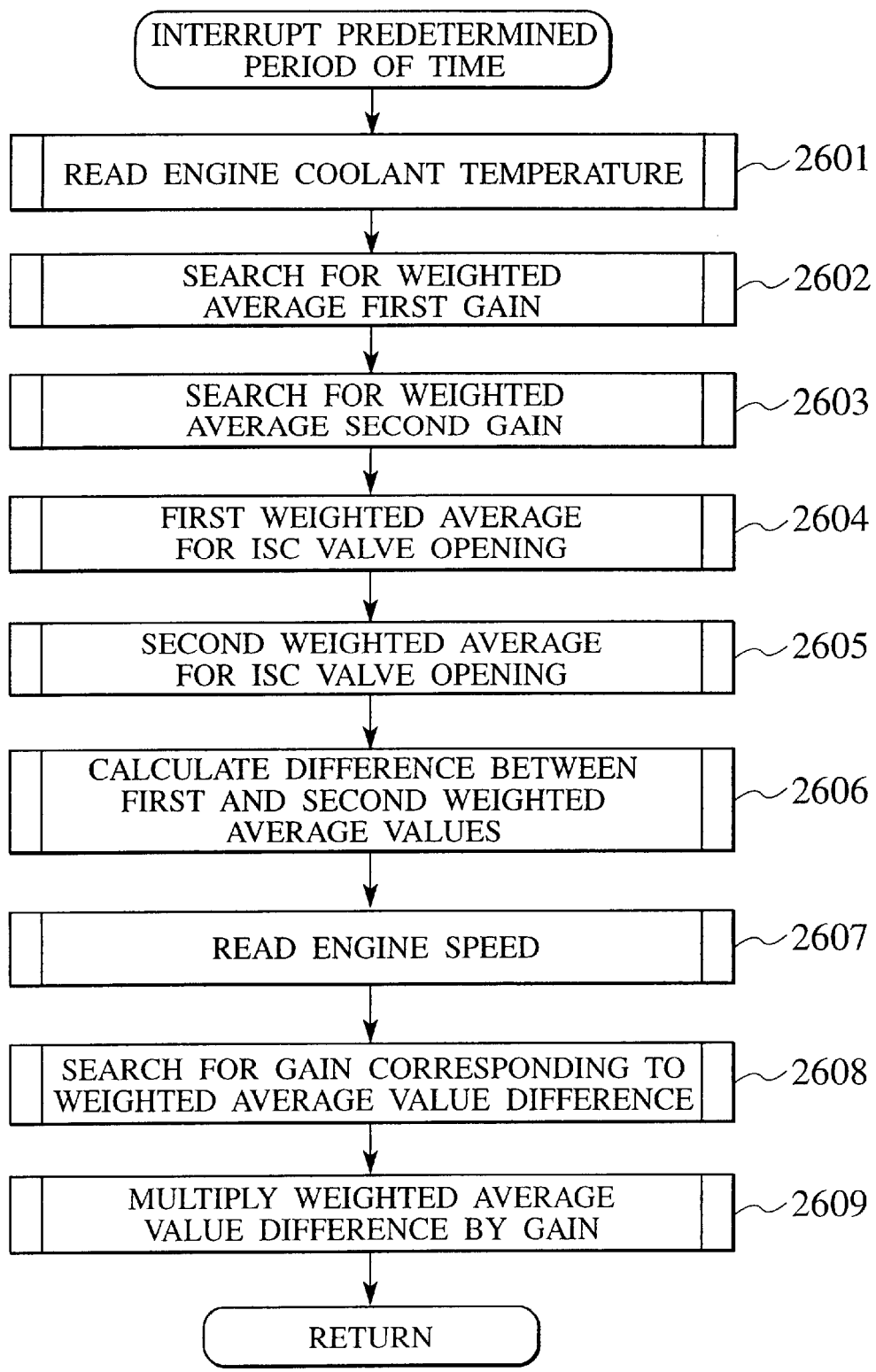
FIG. 26 is a flowchart for the ISC valve opening variation amount correction amount and the ISC valve feedback variation amount correction amount calculation block of the engine fuel control device according to the preferred embodiment.

FIG. 26 is a flowchart for the ISC valve opening variation amount correction amount and the ISC valve feedback variation amount correction amount calculation block shown in FIG. 11. Since the calculation block for the ISC valve opening variation amount correction amount is the same as that for the ISC valve feedback variation amount correction amount, FIG. 26 shows an example of the calculation block for the ISC valve opening variation amount correction amount. In steps 2601, 2602, 2603, 2604, and 2605, a search is done through a table for a first gain and a second gain with respect to the engine coolant temperature and a first weighted average value and a second weighted average value, which represent the ISC valve opening with the first and the second gains incorporated, are calculated. In step 2606, the deviation between the first and the second weighted average values is calculated. In steps 2607 and 2608, a search is done for a gain with respect to the engine speed and, in step 2609, the gain is multiplied by the deviation between the two weighted average values and an output is provided as the ISC valve opening variation amount correction amount.

Figure 27:
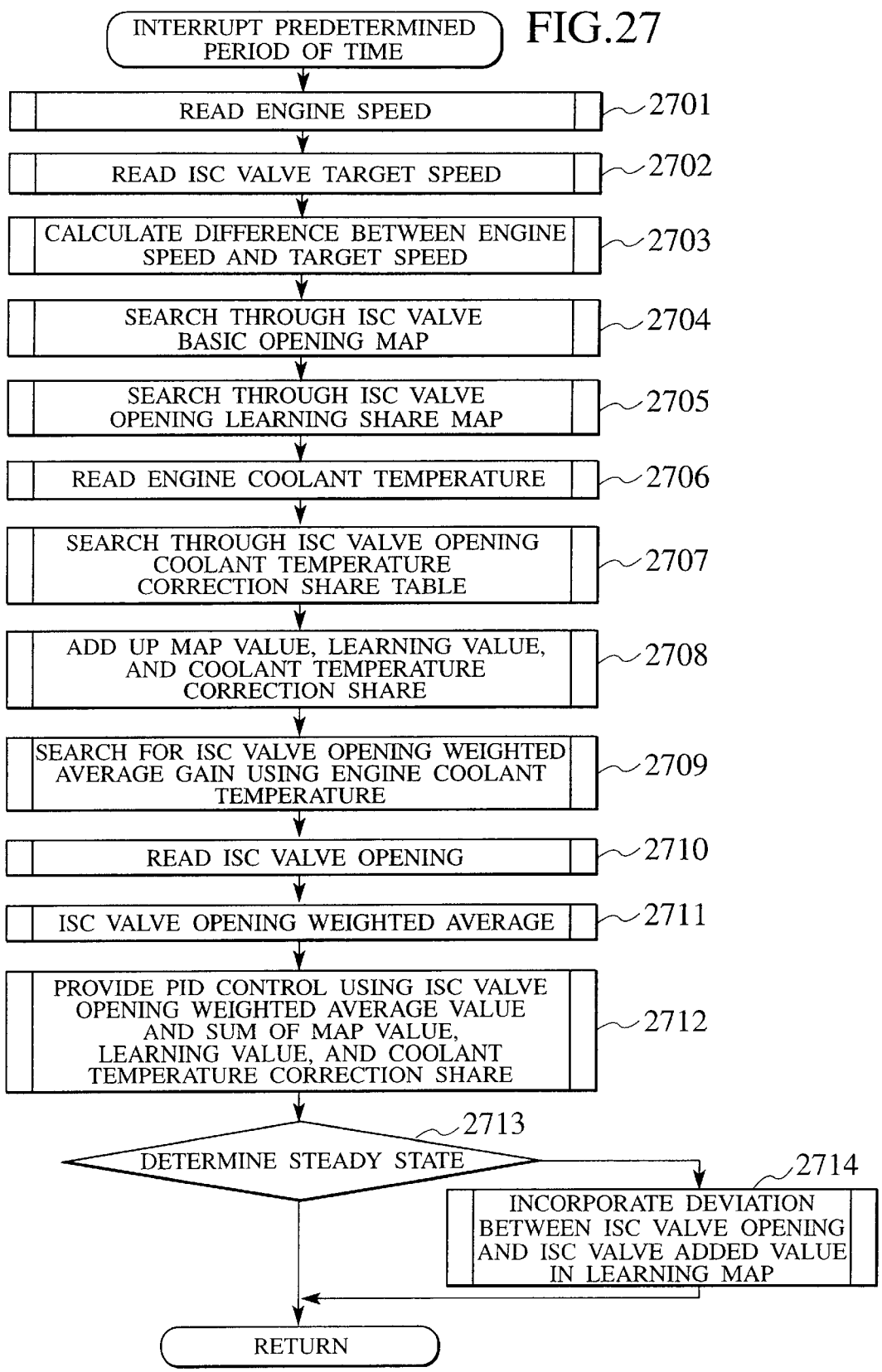
FIG. 27 is a flowchart for the ISC valve opening variation amount correction amount of the engine fuel control device according to the preferred embodiment.

FIG. 27 is a flowchart for the ISC valve opening variation amount correction amount shown in FIG. 12.

In step 2701, the engine speed is read. In step 2702, the ISC valve target speed is read. In step 2703, the difference between the engine speed and the target speed is calculated. In step 2704, a search is done through a map for the ISC valve basic opening with the engine speed and the difference used as keys. In step 2705, a search is done through a map for the ISC valve opening learning share with the engine speed and the engine load used as keys. In steps 2706 and 2707, a search is done through a table for the ISC valve opening coolant temperature correction share with the engine coolant temperature used as a key. In step 2708, the ISC valve basic opening map value, the ISC valve opening learning value, and the ISC valve opening coolant temperature correction share are added up to arrive at the ISC valve added value. In steps 2709, 2710, and 2711, a search is done through a table for a weighted average gain with respect to the engine coolant temperature and the weighted average is calculated of the ISC valve opening. In step 2712, a PID control is provided to let the ISC valve added value follow the ISC valve opening weighted average value and an output is provided of the result of the PID control as the variation amount correction amount. In step 2713, it is determined whether the engine is in a steady state. If it is determined that the engine is in the steady state, the deviation between the ISC valve opening and the ISC valve added value is incorporated in the ISC valve opening learning share map in step 2714.

Figure 28:
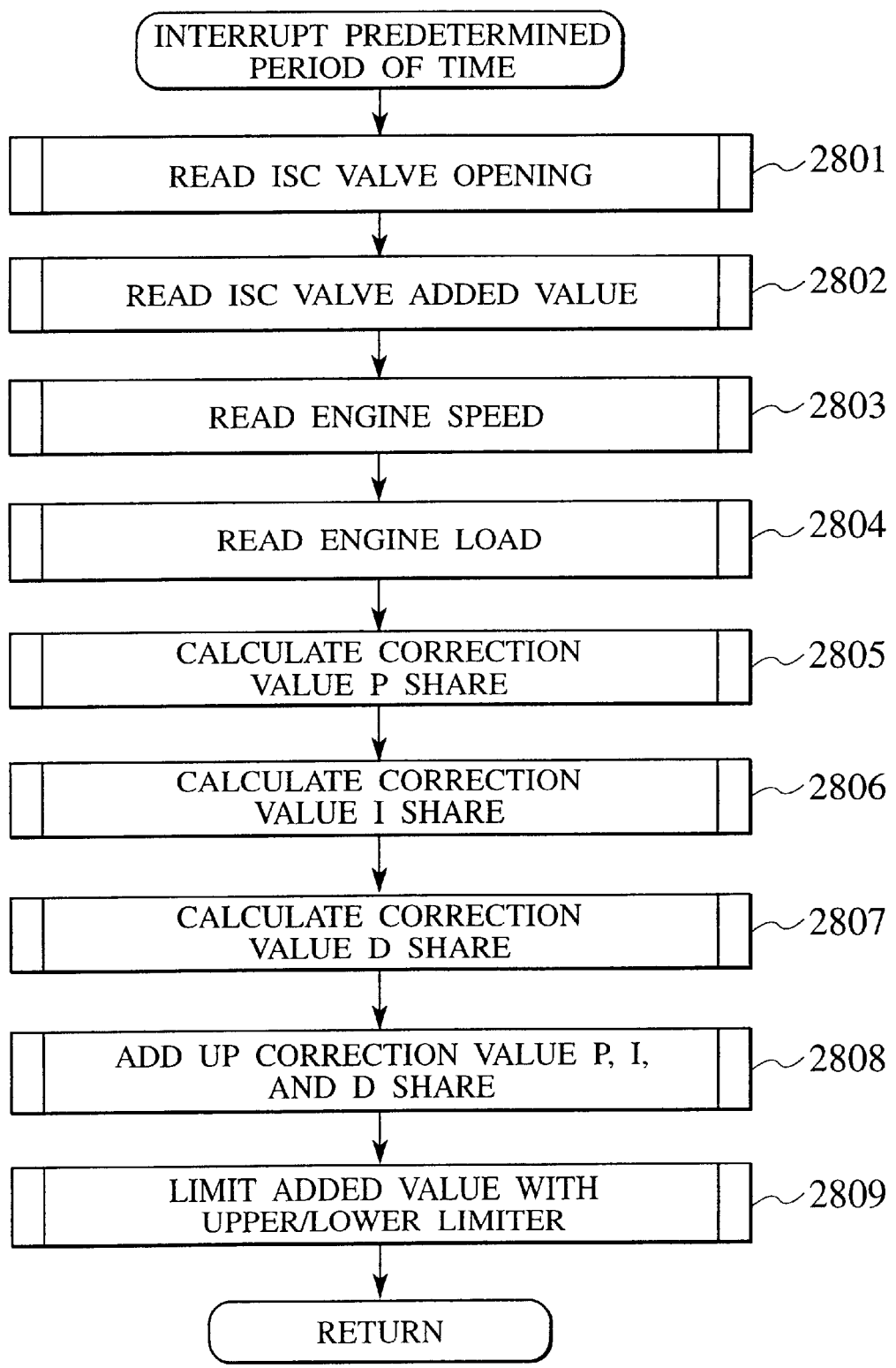
FIG. 28 is a flowchart for the PID feedback calculation block of the engine fuel control device according to the preferred embodiment.

FIG. 28 is a flowchart for the PID feedback calculation block shown in FIG. 13. In step 2801, the ISC valve opening is read. In step 2802, the ISC valve added value is read. In step 2803, the engine speed is read. In step 2804, the engine load is read. In steps 2805, 2806, and 2807, the correction share P share, the correction share I share, and the correction share D share are calculated. In step 2808, the P share, the I share, and the D share are added up. In step 2809, the added sum undergoes upper/lower limiting before being output as the ISC valve opening variation amount correction value.

Figure 29:
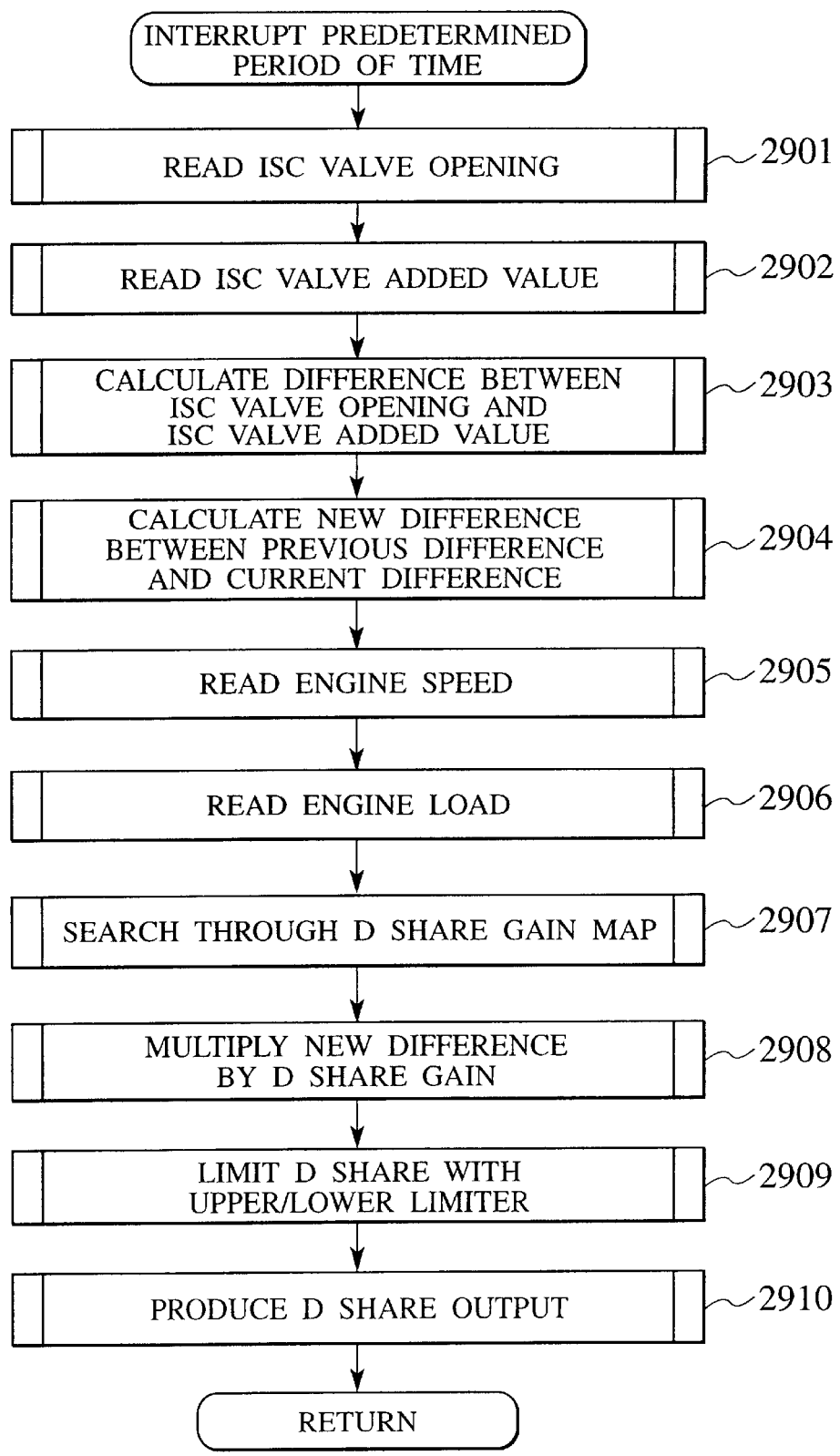
FIG. 29 is a flowchart for the control provided to calculate the D share of PID control of the ISC valve opening and the ISC valve added value of the engine fuel control device according to the preferred embodiment.

FIG. 29 is a flowchart for the control provided to calculate the D share of PID control of the ISC valve opening and the ISC valve added value shown in FIG. 14.

In step 2901, the ISC valve opening is read. In step 2902, the ISC valve added value is read. In step 2903, the difference between the ISC valve opening and the ISC valve added value is calculated. In step 2904, a new difference is calculated between the difference between the ISC valve opening and the ISC valve added value and the current difference. In step 2905, the engine speed is read. In step 2906, the engine load is read. In step 2907, a search is done through a map for the D share gain with the engine speed and the engine load used as keys. In step 2908, the D share gain is multiplied by the new difference. The resultant value is subjected to upper/lower limiting in step 2909 before being output as the D share in step 2910.

Figure 30:
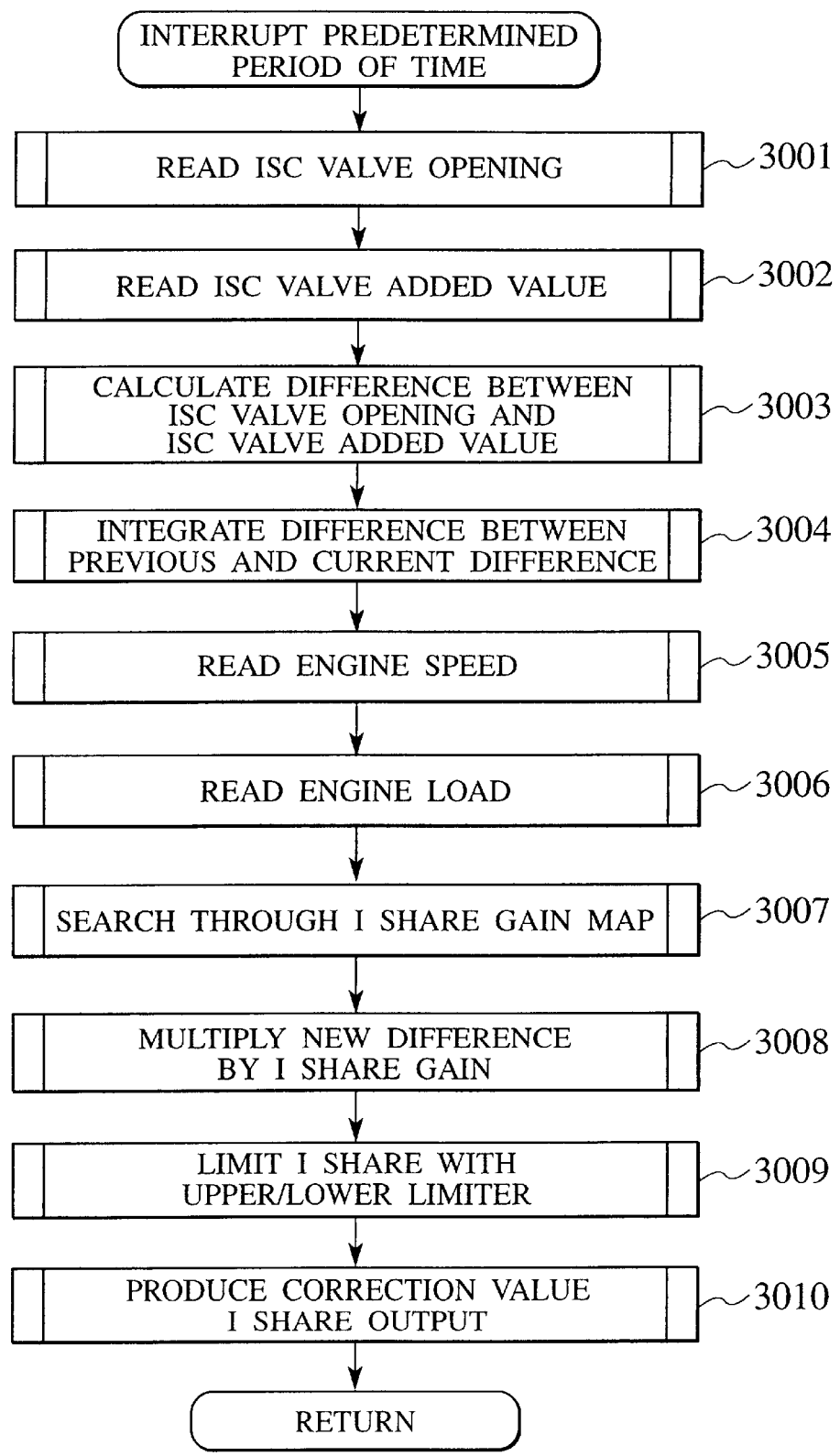
FIG. 30 is a flowchart for the control provided to calculate the I share of PID control of the ISC valve opening and the ISC valve added value of the engine fuel control device according to the preferred embodiment.

FIG. 30 is a flowchart for the control provided to calculate the I share of PID control of the ISC valve opening and the ISC valve added value shown in FIG. 15.

In step 3001, the ISC valve opening is read. In step 3002, the ISC valve added value is read. In step 3003, the difference between the ISC valve opening and the ISC valve added value is calculated. In step 3004, the difference between the previous and the current differences is integrated. In step 3005, the engine speed is read. In step 3006, the engine load is read. In step 3007, a search is done through a map for the I share gain with the engine speed and the engine load used as keys. In step 3008, the I share gain is multiplied by the integrated value of the difference. The resultant value is subjected to upper/lower limiting in step 3009 before being output as the I share in step 3010.

Figure 31:
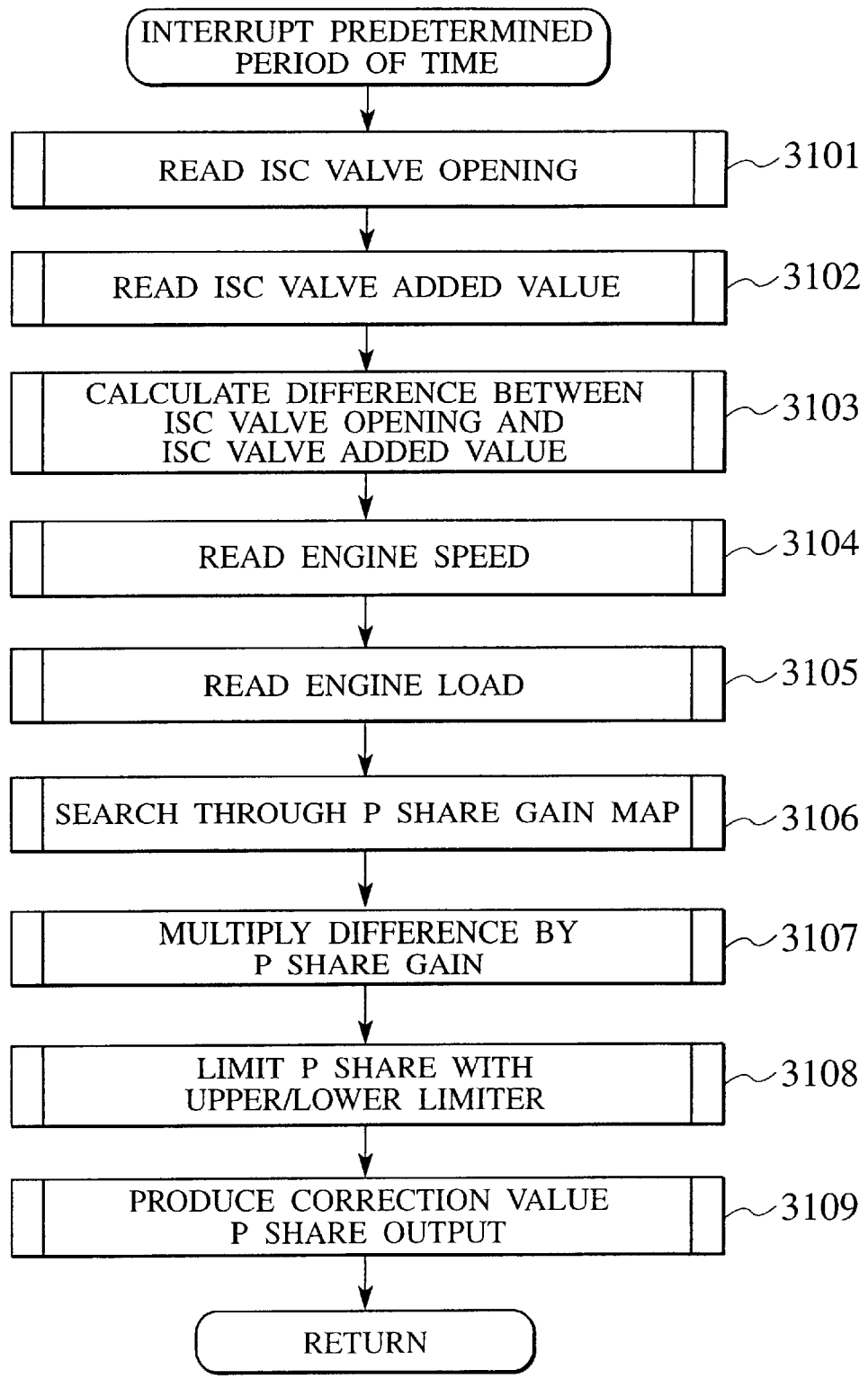
FIG. 31 is a flowchart for the control provided to calculate the P share of PID control of the ISC valve opening and the ISC valve added value of the engine fuel control device according to the preferred embodiment.

FIG. 31 is a flowchart for the control provided to calculate the P share of PID control of the ISC valve opening and the ISC valve added value shown in FIG. 16.

In step 3101, the ISC valve opening is read. In step 3102, the ISC valve added value is read. In step 3103, the difference between the ISC valve opening and the ISC valve added value is calculated. In step 3104, the engine speed is read. In step 3105, the engine load is read. In step 3106, a search is done through a map for the P share gain with the engine speed and the engine load used as keys. In step 3107, the P share gain is multiplied by the difference. The resultant value is subjected to upper/lower limiting in step 3108 before being output as the P share in step 3109.

As explained in the foregoing descriptions, the engine fuel control device according to the preferred embodiment of the present invention is provided with the following components. Namely, the idle speed control valve 205 that controls the flow path area of the flow path connected to the intake pipe 204 by bypassing the throttle valve 202, thereby controlling the engine speed during idling; the air bleed valve 208 that is disposed downstream from the regulator 207 for regulating the pressure of the fuel gas supplied to the engine and that controls the flow path area of the passage open to atmosphere; the target speed setting means that sets a target engine speed during idling; the throttle valve opening control means that controls the idle speed control valve 205 so as to maintain the target engine speed; the control factor setting means that sets a factor so as to control the opening of the idle speed control valve 205; the capturing means that captures a change in the state of the factor; and the control means that controls the air bleed valve 208 based on the change in the state of the factor captured by the capturing means. Because of this arrangement, the engine fuel control device according to the preferred embodiment of the present invention can control air-fuel ratio fluctuations occurring from changes in the ISC valve opening as a result of sudden changes in the target speed and load by controlling the air bleed valve 208.

If, for example, there is a change in the target speed during idling, it changes the ISC valve opening. This accordingly changes the venturi chamber pressure, which in turn changes the amount of inflow of the fuel mixture gas. To counteract this situation, the air bleed valve 208 is controlled in advance in accordance with the variation amount of the target speed, which effectively prevents the air-fuel ratio from becoming excessively rich or lean. If the engine speed deviates from the target speed to a disturbance of some sort on the engine, the air bleed valve 208 is controlled in accordance with the change in the basic amount and that is the ISC valve feedback amount so as to prevent the air-fuel ratio from becoming excessively rich or lean.

While the invention has been described with reference to a preferred embodiment thereof, it is to be understood that the invention is not limited to the preferred embodiment. Rather, the invention is intended to cover various modifications in design within the spirit and scope of the invention as claimed.

For example, the engine control unit 214 according to the preferred embodiment uses the oxygen concentration sensor 212 that provides an output of an air-fuel ratio signal that is linear to the exhaust air-fuel ratio for providing the target speed feedback control by means of the ISC feedback control means 103 and for making the basic opening correction by the opening correction value calculation means 107. Instead of using this type of oxygen concentration sensor, an oxygen concentration sensor (not shown) that provides an output of a signal indicating that the exhaust gas of the engine 201 is on either the rich side or the lean side with respect to the stoichiometric air-fuel ratio.

Furthermore, according to the preferred embodiment, three control methods of a proportional control (P control), an integral control (I control), and a derivative control (D control) in the PID control are employed to obtain respective operation values through arithmetic operations performed of air-fuel ratio differences, which are added up to arrive at the air-fuel ratio correction coefficient. It is also possible to use either one or two of the three control methods (for example, PI control or the like) to obtain operation values, and the air-fuel ratio correction coefficient is calculated based on the operation values.

As can be understood from the foregoing descriptions, the engine fuel control device and the idling air-fuel ratio control method according to the preferred embodiment of the present invention make it possible, in the venturi type fuel supply device, to retain a stabilized air-fuel ratio and thus a stabilized engine speed by preventing the air-fuel ratio during idling from becoming excessively rich or lean.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An engine fuel control device, comprising:
   a fuel supply means that supplies an engine with a fuel;
   a mixture ratio determination means that determines a mixing ratio of the fuel and air;
   a mixture introduction means that introduces the air-fuel mixture, whose mixing ratio has been established, into the engine;
   a first throttle valve that is disposed in an intake pipe of the engine;
   a bypass passage that bypasses the first throttle valve;
   a second throttle valve that is disposed in the bypass passage;
   a target speed setting means that sets a target engine speed during idling;
   a throttle valve opening control means that controls the opening of the second throttle valve so as to maintain the target engine speed;
   a control factor setting means that sets a factor so as to control the opening of the second throttle valve;
   a capturing means that captures a change in a state of the factor; and
   a control means that controls the mixture ratio determination means based on the change in the state of the factor captured by the capturing means.

2. The engine fuel control device according to claim 1, wherein the mixture ratio determination means is an air bleed valve that determines a mixing ratio of a mixture of fuel gas and air.

3. The engine fuel control device according to claim 1, wherein factors that the control factor setting means is to set includes a predetermined basic opening of the throttle valve so as to maintain the target speed.

4. The engine fuel control device according to claim 1, wherein factors that the control factor setting means is to set includes an opening calculated through a feedback control performed for making up for any deviation between the engine speed and the target speed.

5. The engine fuel control device according to claim 1, wherein factors that the control factor setting means is to set includes a value storing an opening as calculated through a feedback control performed for expediting convergence of the deviation between the engine speed and the target speed.

6. The engine fuel control device according to claim 1, wherein the capturing means captures a change in the state of the factor from the amount of change in the target speed.

7. The engine fuel control device according to claim 6, wherein the amount of change in the target speed is detected by means of the deviation between a current engine speed and the target speed.

8. The engine fuel control device according to claim 1, wherein the capturing means captures a change in the state of the factor from a variation amount of the predetermined basic opening of the throttle valve.

9. The engine fuel control device according to claim 1, wherein the capturing means captures a change in the state of the factor from a variation amount of the opening calculated through the feedback control.

* * * * *